United States Patent
Park et al.

(10) Patent No.: US 8,145,859 B2
(45) Date of Patent: Mar. 27, 2012

(54) METHOD AND SYSTEM FOR SPILLING FROM A QUEUE TO A PERSISTENT STORE

(75) Inventors: Hoyong Park, San Jose, CA (US);
Namit Jain, Santa Clara, CA (US);
Anand Srinivasan, Bangalore (IN);
Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 352 days.

(21) Appl. No.: 12/396,008

(22) Filed: Mar. 2, 2009

(65) Prior Publication Data
US 2010/0223437 A1 Sep. 2, 2010

(51) Int. Cl.
*G06F 12/02* (2006.01)
(52) U.S. Cl. ......... 711/159; 711/133; 711/134; 711/160
(58) Field of Classification Search .......... 711/133–135, 711/159–160, E12.002
See application file for complete search history.

(56) References Cited

U.S. PATENT DOCUMENTS

| | | |
|---|---|---|
| 4,996,687 A | 2/1991 | Hess et al. |
| 5,051,947 A | 9/1991 | Messenger et al. |
| 5,495,600 A | 2/1996 | Terry et al. |
| 5,802,262 A | 9/1998 | Van De Vanter |
| 5,822,750 A | 10/1998 | Jou et al. |
| 5,826,077 A | 10/1998 | Blakeley et al. |
| 5,857,182 A | 1/1999 | DeMichiel et al. |
| 5,937,401 A | 8/1999 | Hillegas |
| 6,006,235 A | 12/1999 | Macdonald et al. |
| 6,092,065 A | 7/2000 | Floratos et al. |
| 6,108,666 A | 8/2000 | Floratos et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,353,821 B1 | 3/2002 | Gray |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,438,540 B2 | 8/2002 | Nasr et al. |
| 6,449,620 B1 | 9/2002 | Draper et al. |
| 6,507,834 B1 | 1/2003 | Kabra et al. |

(Continued)

FOREIGN PATENT DOCUMENTS

EP 1241589 A2 9/2002

(Continued)

OTHER PUBLICATIONS

"StreamBase New and Noteworthy," StreamBase, dated Jan. 12, 2010, 878 pages.

(Continued)

*Primary Examiner* — Jasmine Song
(74) *Attorney, Agent, or Firm* — Kilpatrick Townsend & Stockton LLP

(57) ABSTRACT

Techniques for managing memory usage of a processing system by spilling data from a memory to a persistent store based upon an evict policy are provided. A triggering event is detected. In response to the triggering event and based on the evict policy, it is determined whether data from the memory of the processing system is to be spilled to the persistent storage. The determination is made by comparing a level of free memory of the processing system with a threshold specified by the evict policy. The data is evicted from the memory.

19 Claims, 10 Drawing Sheets

U.S. PATENT DOCUMENTS

| | | |
|---|---|---|
| 6,523,102 B1 | 2/2003 | Dye et al. |
| 6,546,381 B1 | 4/2003 | Subramanian et al. |
| 6,708,186 B1 | 3/2004 | Claborn et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,856,981 B2 | 2/2005 | Wyschogrod et al. |
| 6,985,904 B1 | 1/2006 | Kaluskar et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,483,976 B2 | 1/2009 | Ross |
| 7,516,121 B2 | 4/2009 | Liu et al. |
| 7,519,577 B2 | 4/2009 | Brundage et al. |
| 7,552,365 B1 | 6/2009 | March et al. |
| 7,567,953 B2 | 7/2009 | Kadayam et al. |
| 7,613,848 B2 | 11/2009 | Amini et al. |
| 7,620,851 B1 | 11/2009 | Leavy et al. |
| 7,630,982 B2 | 12/2009 | Boyce |
| 7,636,703 B2 | 12/2009 | Taylor |
| 7,673,065 B2 | 3/2010 | Srinivasan et al. |
| 7,676,461 B2 | 3/2010 | Chikodrov et al. |
| 7,689,622 B2 | 3/2010 | Liu et al. |
| 7,702,629 B2 | 4/2010 | Cytron et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,827,190 B2 | 11/2010 | Pandya |
| 7,870,124 B2 | 1/2011 | Liu et al. |
| 7,917,299 B2 | 3/2011 | Buhler et al. |
| 7,930,322 B2 | 4/2011 | MacLennan |
| 7,979,420 B2 | 7/2011 | Jain et al. |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0037048 A1 | 2/2003 | Kabra et al. |
| 2003/0065655 A1 | 4/2003 | Syeda-Mahmood |
| 2003/0065659 A1 | 4/2003 | Agarwal et al. |
| 2003/0200198 A1 | 10/2003 | Chandrasekar et al. |
| 2003/0236766 A1 | 12/2003 | Fortuna et al. |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0167864 A1 | 8/2004 | Wang et al. |
| 2004/0177053 A1 | 9/2004 | Donoho et al. |
| 2004/0220912 A1 | 11/2004 | Manikutty et al. |
| 2004/0220927 A1 | 11/2004 | Murthy et al. |
| 2004/0267760 A1 | 12/2004 | Brundage et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0174940 A1 | 8/2005 | Iny |
| 2005/0229158 A1 | 10/2005 | Thusoo et al. |
| 2005/0273450 A1 | 12/2005 | McMillen et al. |
| 2006/0031204 A1 | 2/2006 | Liu et al. |
| 2006/0100969 A1 | 5/2006 | Wang et al. |
| 2006/0106797 A1 | 5/2006 | Srinivasa et al. |
| 2006/0155719 A1 | 7/2006 | Mihaeli et al. |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0294095 A1 | 12/2006 | Berk et al. |
| 2007/0022092 A1 | 1/2007 | Nishizawa et al. |
| 2007/0039049 A1 | 2/2007 | Kupferman et al. |
| 2007/0118600 A1* | 5/2007 | Arora .......................... 709/206 |
| 2007/0136239 A1 | 6/2007 | Lee et al. |
| 2007/0136254 A1 | 6/2007 | Choi et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0010241 A1 | 1/2008 | McGoveran |
| 2008/0028095 A1 | 1/2008 | Lang et al. |
| 2008/0034427 A1 | 2/2008 | Cadambi et al. |
| 2008/0046401 A1 | 2/2008 | Lee et al. |
| 2008/0077570 A1 | 3/2008 | Tang et al. |
| 2008/0077587 A1 | 3/2008 | Wyschogrod et al. |
| 2008/0082484 A1 | 4/2008 | Averbuch et al. |
| 2008/0082514 A1 | 4/2008 | Khorlin et al. |
| 2008/0114787 A1 | 5/2008 | Kashiyama et al. |
| 2008/0120283 A1 | 5/2008 | Liu et al. |
| 2008/0195577 A1 | 8/2008 | Fan et al. |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2009/0006320 A1 | 1/2009 | Ding et al. |
| 2009/0019045 A1 | 1/2009 | Amir et al. |
| 2009/0043729 A1 | 2/2009 | Liu et al. |
| 2009/0070786 A1 | 3/2009 | Alves et al. |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0125550 A1 | 5/2009 | Barga et al. |
| 2009/0216747 A1 | 8/2009 | Li et al. |
| 2009/0216860 A1 | 8/2009 | Li et al. |
| 2009/0248749 A1 | 10/2009 | Gu et al. |
| 2010/0017379 A1 | 1/2010 | Naibo et al. |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0223305 A1 | 9/2010 | Park et al. |
| 2010/0223606 A1 | 9/2010 | Park et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0055192 A1 | 3/2011 | Tang et al. |
| 2011/0161321 A1 | 6/2011 | de Castro Alves et al. |
| 2011/0161328 A1 | 6/2011 | Park et al. |
| 2011/0161352 A1 | 6/2011 | de Castro Alves et al. |
| 2011/0161356 A1 | 6/2011 | de Castro Alves et al. |
| 2011/0196891 A1 | 8/2011 | de Castro Alves et al. |

FOREIGN PATENT DOCUMENTS

| | | |
|---|---|---|
| WO | WO 00/49533 A2 | 8/2000 |
| WO | WO 01/059602 A2 | 8/2001 |
| WO | WO 01/65418 A2 | 9/2001 |
| WO | WO 03/030031 A2 | 4/2003 |

OTHER PUBLICATIONS

Non-Final Office Action for U.S. Appl. No. 12/548,187, mailed on Sep. 27, 2011, 19 pages.

Final Office Action for U.S. Appl. No. 12/395,871, mailed on Oct. 19, 2011, 33 pages.

Non-Final Office Action for U.S. Appl. No. 12/548,222, mailed on Oct. 19, 2011, 27 pages.

Non-Final Office Action for U.S. Appl. No. 12/548,281, mailed on Oct. 3, 2011, 37 pages.

Non-Final Office Action for U.S. Appl. No. 12/548,290, mailed on Oct. 3, 2011, 34 pages.
Notice of Allowance for U.S. Appl. No. 11/874,896, mailed on Jun. 23, 2011, 30 pages.
Final Office Action for U.S. Appl. No. 11/874,197, mailed on Aug. 12, 2011, 26 pages.
Notice of Allowance for U.S. Appl. No. 11/927,681, mailed on Jul. 1, 2011, 8 pages.
Final Office Action for U.S. Appl. No. 11/927,683, mailed on Sep. 1, 2011, 18 pages.
Abadi, et al., "Aurora: A Data Stream Management System," International Conference on Management of Data, Proceedings of the 2003 ACM SIGMOD International Conference on Management of Data, ACM Press, 2003, 4 pages.
Aho, et al., "Efficient String Matching: An Aid to Bibliographic Search," Communications of the ACM, Jun. 1975, vol. 18, No. 6, pp. 333-340, Copyright 1975, Association for Computing Machinery, Inc.
Arasu, "CQL: A language for Continuous Queries over Streams and Relations," Lecture Notes in Computer Science, 2004, vol. 2921/2004, pp. 1-19.
Arasu, et al., "The CQL Continuous Query Language: Semantic Foundations and Query Execution," Stanford University, The VLDB Journal—The International Journal on Very Large Data Bases, Jun. 2006, vol. 15, issue 2, pp. 1-32, Springer-Verlag New York, Inc.
Arasu, et al., "An Abstract Semantics and Concrete Language for Continuous Queries over Streams and Relations," 9th International Workshop on Database programming languages, Sep. 2003, 11 pages.
Arasu, et al., "STREAM: The Stanford Data Stream Management System," Department of Computer Science, Stanford University, 2004, page 21.
Avnur, et al., "Eddies: Continuously Adaptive Query Processing," In Proceedings of the 2000 ACM SIGMOD International Conference on Data, Dallas TX, May 2000, 12 pages.
Avnur, et al., "Eddies: Continuously Adaptive Query Processing," slide show, believed to be prior to Oct. 17, 2007, 4 pages.
Babu, et al., "Continuous Queries over Data Streams," SIGMOD Record, Sep. 2001, vol. 30, No. 3, pp. 109-120.
Bai, et al., "A Data Stream Language and System Designed for Power and Extensibility," Conference on Information and Knowledge Management, Proceedings of the 15th ACM International Conference on Information and Knowledge Management, Arlington, Virginia, Nov. 5-11, 2006, 10 pages, Copyright 2006, ACM Press.
Bose, et al., "A Query Algebra for Fragmented XML Stream Data", 9th International Conference on Data Base Programming Languages (DBPL), Sep. 6-8, 2003, Potsdam, Germany, at URL: http://lambda,uta.edu/dbp103.pdf, 11 pages.
Buza, "Extension of CQL over Dynamic Databases," Journal of Universal Computer Science, 2006, vol. 12, No. 9, pp. 1165-1176.
Carpenter, "User Defined Functions," Oct. 12, 2000, at URL: http://www.sqlteam.com/itemprint.asp?ItemID=979, 4 pages.
Chan, et al., "Efficient Filtering of XML documents with Xpath expressions," VLDB Journal, 2002, pp. 354-379.
Chandrasekaran, et al., "TelegraphCQ: Continuous Dataflow Processing for an Uncertain World," Proceedings of CIDR 2003, 12 pages.
Chen, et al., "NiagaraCQ: A Scalable Continuous Query System for Internet Databases," Proceedings of the 2000 SIGMOD International Conference on Management of Data, May 2000, pp. 379-390.
Colyer, et al., "Spring Dynamic Modules Reference Guide," Copyright 2006-2008, ver. 1.0.3, 73 pages.
Colyer, et al., "Spring Dynamic Modules Reference Guide," Copyright 2006-2008, ver. 1.1.3, 96 pages.
"Complex Event Processing in the Real World," an Oracle White Paper, Sep. 2007, 13 pages.
Conway, "An Introduction to Data Stream Query Processing," Truviso, Inc., May 24, 2007, at URL: http://neilconway.org/talks/stream_intro.pdf, 71 pages.
"Coral8 Complex Event Processing Technology Overview," Coral8, Inc., Make it Continuous, pp. 1-8, Copyright 2007, Coral8, Inc.
"Creating WebLogic Domains Using the Configuration Wizard," BEA Products, Dec. 2007, ver. 10.0, 78 pages.
"Creating Weblogic Event Server Applications," BEA WebLogic Event Server, Jul. 2007, ver. 2.0, 90 pages.
Demers, et al., "Towards Expressive Publish/Subscribe Systems," Proceedings of the 10th International Conference on Extending Database Technology (EDBT 2006), Munich, Germany, Mar. 2006, pp. 1-18.
DeMichiel, et al., "JSR 220: Enterprise JavaBeans™, EJB 3.0 Simplified API," EJB 3.0 Expert Group, Sun Microsystems, May 2, 2006, ver. 3.0, 59 pages.
"Dependency Injection," Wikipedia, Dec. 30, 2008, printed on Apr. 29, 2011, at URL: http:en.wikipedia.org/w/index.php?title=Dependency_injection&oldid=260831402, pp. 1-7.
"Deploying Applications to WebLogic Server," BEA WebLogic Server, Mar. 30, 2007, ver. 10.0, 164 pages.
Deshpande, et al., "Adaptive Query Processing," slide show believed to be prior to Oct. 17, 2007, 27 pages.
"Developing Applications with Weblogic Server," BEA WebLogic Server, Mar. 30, 2007, ver. 10.0, 254 pages.
Diao, "Query Processing for Large-Scale XML Message Brokering," 2005, University of California Berkeley, 226 pages.
Diao, et al. "Query Processing for High-Volume XML Message Brokering", Proceedings of the 29th VLDB Conference, Berlin, Germany, 2003, 12 pages.
Dindar, et al., "Event Processing Support for Cross-Reality Environments," Pervasive Computing, IEEE CS, Jul.-Sep. 2009, pp. 2-9, Copyright 2009, IEEE.
"EPL Reference," BEA WebLogic Event Server, Jul. 2007, ver. 2.0, 82 pages.
Esper Reference Documentation, Copyright 2007, ver. 1.12.0, 158 pages.
Esper Reference Documentation, Copyright 2008, ver. 2.0.0, 202 pages.
"Fast Track Deployment and Administrator Guide for BEA WebLogic Server," BEA WebLogic Server 10.0 Documentation, printed on May 10, 2010, at URL: http://download.oracle.com/docs/cd/E13222_01/wls/docs100/quickstart/quick_start.htmI, 1 page.
Fernandez, et al., "Build your own XQuery processor", slide show, at URL: http://www.galaxquery.org/slides/edbt-summer-school2004.pdf, 2004, 116 pages.
Fernandez, et al., Implementing XQuery 1.0: The Galax Experience:, Proceedings of the 29th VLDB Conference, Berlin, Germany, 2003, 4 pages.
Florescu, et al., "The BEA/XQRL Streaming XQuery Processor," Proceedings of the 29th VLDB Conference, 2003, Berlin, Germany, 12 pages.
"Getting Started with WebLogic Event Server," BEA WebLogic Event Server, Jul. 2007, ver. 2.0, 66 pages.
Gilani, "Design and implementation of stream operators, query instantiator and stream buffer manager," Dec. 2003, 137 pages.
Golab, "Sliding Window Query Processing Over Data Streams," University of Waterloo, Waterloo, Ont. Canada, Aug. 2006, 182 pages.
Golab, et al., "Issues in Data Stream Management," ACM SIGMOD Record, vol. 32, issue 2, Jun. 2003, ACM Press, pp. 5-14.
Gosling, et al., "The Java Language Specification," Book, copyright 1996-2005, 3rd edition, 684 pages, Sun Microsystems USA.
Hopcroft, "Introduction to Automata Theory, Languages, and Computation," Second Edition, Addison-Wesley, Copyright 2001, 524 pages.
"Installing Weblogic Real Time," BEA WebLogic Real Time, Jul. 2007, ver. 2.0, 64 pages.
"Introduction to BEA WebLogic Server and BEA WebLogic Express," BEA WebLogic Server, Mar. 2007, ver. 10.0, 34 pages.
"Introduction to WebLogic Real Time," BEA WebLogic Real Time, Jul. 2007, ver. 2.0, 20 pages.
"Jboss Enterprise Application Platform 4.3 Getting Started Guide CP03, for Use with Jboss Enterprise Application Platform 4.3 Cumulative Patch 3," Jboss a division of Red Hat, Red Hat Documentation Group, Publication date Sep. 2007, Copyright 2008, 68 pages, Red Hat, Inc.

Jin, et al. "ARGUS: Efficient Scalable Continuous Query Optimization for Large-Volume Data Streams" 10th International Database Engineering and Applications Symposium (IDEAS'06), 2006, 7 pages.

Kawaguchi, "Java Architecture for XML Binding _ (JAXB) 2.0," Sun Microsystems, Inc., Apr. 19, 2006, 384 pages.

Knuth, et al., "Fast Pattern Matching in Strings," SIAM J. Comput., vol. 6, No. 2, Jun. 1977, pp. 323-350.

Lakshmanan, et al., "On efficient matching of streaming XML documents and queries," 2002, 18 pages.

Lindholm, et al., "Java Virtual Machine Specification, 2nd Edition", Prentice Hall, Apr. 1999, 484 pages.

Liu, et al., "Efficient XSLT Processing in Relational Database System," Proceeding of the 32nd. International Conference on Very Large Data Bases (VLDB), Sep. 2006, 1106-1116, 11 pages.

Luckham, "What's the Difference Between ESP and CEP?" Complex Event Processing, downloaded Apr. 29, 2011, at URL: http://complexevents.com/?p=103, 5 pages.

Madden, et al., "Continuously Adaptive Continuous Queries (CACQ) over Streams," SIGMOD 2002, Jun. 4-6, 2002, 12 pages.

"Managing Server Startup and Shutdown," BEA WebLogic Server, Mar. 30, 2007, ver. 10.0, 134 pages.

"Matching Behavior," .NET Framework Developers Guide, Copyright 2008 Microsoft Corporation, downloaded Jul. 1, 2008 from URL: http://msdn.microsoft.com/en-us/library/0yzc2yb0(printer).aspx, pp. 1-2.

Motwani, et al., "Models and Issues in Data Streams," Proceedings of the 21st ACM SIGMOD-SIGACT-SIDART sympposium on Principles f database systems, 2002, 30 pages.

Motwani, et al., "Query Processing Resource Management, and Approximation in a Data Stream Management System," Proceedings of CIDR 2003, Jan. 2003, 12 pages.

Munagala, et al., "Optimization of Continuous Queries with Shared Expensive Filters," Proceedings of the 26th ACM SIGMOD-SIGACT-SIGART symposium on Principles of database systems, believed to be prior to Oct. 17, 2007, p. 14.

"New Project Proposal for Row Pattern Recognition—Amendment to SQL with Application to Streaming Data Queries," H2-2008-027, H2 Teleconference Meeting, Jan. 9, 2008, pp. 1-6.

Novick, "Creating a User Defined Aggregate with SQL Server 2005," at URL: http://novicksoftware.com/Articles/sql-2005-product-user-defined-aggregate.html, 2005, 6 pages.

Oracle Database, SQL Language Reference, 11g Release 1 (11.1), B28286-02, Sep. 2007, 1496 pages, Oracle.

Oracle Application Server 10g, Release 2 and 3, New Features Overview, An Oracle White Paper, Oct. 2005, 48 pages, Oracle.

Oracle Application Server, Administrator's Guide, 10g Release 3 (10.1.3.2.0), B32196-01, Jan. 2007, 376 pages, Oracle.

Oracle Application Server, Enterprise Deployment Guide, 10g Release 3 (10.1.3.2.0), B32125-02, Apr. 2007, 120 pages, Oracle.

Oracle Application Server, High Availability Guide, 10g Release 3 (10.1.3.2.0), B32201-01, Jan. 2007, 314 pages, Oracle.

"Oracle CEP Getting Started," Release 11gR1 (11.1.1) E14476-01, May 2009, 172 pages.

Oracle Database Data Cartridge Developers Guide, B28425-03, 11g Release 1 (11.1), Oracle, Mar. 2008, 372 pages, Oracle.

Oracle Database, SQL Reference, 10g Release 1 (10.1), Part No. B10759-01, Dec. 2003, pp. 7-1 to 7-17; 7-287 to 7-290; 14-61 to 14-74.

"OSGI Service Platform Core Specification, The OSGI Alliance," Apr. 2007, ver. 4.1, release 4, 288 pages, OSGI Alliance.

Peng, et al., "Xpath Queries on Streaming Data," 2003, pp. 1-12, ACM Press.

Peterson, "Petri Net Theory and the Modeling of Systems", Prentice Hall, Copyright 1981, 301 pages.

PostgresSQL: Documentation: Manuals: PostgresSQL 8.2: Create Aggregate, believed to be prior to Apr. 21, 2007, 4 pages.

PostgresSQL: Documentation: Manuals: PostgresSQL 8.2: User-Defined Aggregates, believed to be prior to Apr. 21, 2007, 4 pages.

"Release Notes," BEA WebLogic Event Server, Jul. 2007, ver. 2.0, 8 pages.

Sadri, et al., "Expressing and Optimizing Sequence Queries in Database Systems," ACM Transactions on Database Systems, Jun. 2004, vol. 29, No. 2, pp. 282-318, ACM Press, Copyright 2004.

Sadtler, et al., "WebSphere Application Server Installation Problem Determination," Copyright 2007, pp. 1-48, IBM Corp.

Sharaf, et al., Efficient Scheduling of Heterogeneous Continuous Queries, VLDB '06, Sep. 12-15, 2006, pp. 511-522.

Spring Dynamic Modules for OSGI Service Platforms product documentation, SpringSource, Jan. 2008, 71 pages.

"Stanford Stream Data Manager," at URL: http://infolab.stanford.edu/stream/, last modified Jan. 5, 2006, pp. 1-9.

Stolze, "User-defined Aggregate Functions in DB2 Universal Database," at URL: http://www.128.ibm.com/developerworks/db2/library/tacharticle/0309stolze/0309stolze.html, Sep. 11, 2003, 11 pages.

Stream Query Repository: Online Auctions (CQL Queries), at URL: http://www-db.stanford.edu/strem/sqr/cql/onauc.html, Dec. 2, 2002, 4 pages.

Stream Query Repository: Online Auctions, at URL: http://www-db.stanford.edu/stream/sqr/onauc.html#queryspecsend, Dec. 2, 2002, 2 pages.

"Stream: The Stanford Stream Data Manager," IEEE Data Engineering Bulletin, Mar. 2003, pp. 1-8.

Streambase 5.1 product documentation, Streambase Systems, copyright 2004-2010, 878 pages.

Terry, et al., "Continuous queries over append-only database," Proceedings of 1992 ACM SIGMOD, pp. 321-330.

"Understanding Domain Configuration," BEA WebLogic Server, Mar. 30, 2007, ver. 10.0, 38 pages.

Vajjhala, et al, "The Java™ Architecture for XML Binding (JAXB) 2.0," Sun Microsystem, Inc., Final Release Apr. 19, 2006, 384 pages.

W3C, "XML Path Language (Xpath)," W3C Recommendation, Nov. 16, 1999, ver. 1.0, at URL: http://www.w3.org/TR/xpath, 37 pages.

"WebLogic Event Server Administration and Configuration Guide," BEA WebLogic Event Server, Jul. 2007, ver. 2.0, 108 pages.

"WebLogic Event Server Reference," BEA WebLogic Event Server, Jul. 2007, ver. 2.0, 52 pages.

"Weblogic Server Performance and Tuning," BEA WebLogic Server, Mar. 30, 2007, ver. 10.0, 180 pages.

"WebSphere Application Server V6.1 Problem Determination: IBM Redpaper Collection," WebSphere Software, IBM/Redbooks, Dec. 2007, 634 pages.

White, et al., "WebLogic Event Server: A Lightweight, Modular Application Server for Event Processing," 2nd International Conference on Distributed Event-Based Systems, Jul. 2-4, 2008, Rome, Italy, 8 pages, ACM Press, Copyright 2004.

Widom, et al., "CQL: A Language for Continuous Queries over Streams and Relations," believed to be prior to Oct. 17, 2007, 62 pages.

Widom, et al., "The Stanford Data Stream Management System," PowerPoint Presentation, believed to be prior to Oct. 17, 2007, 110 pages.

Zemke,"XML Query," Mar. 14, 2004, 29 pages.

De Castro Alves; et al, "Extensible Indexing Framework Using Data Cartridges," U.S. Appl. No. 12/913,636, filed Oct. 27, 2010.

Park, et al., "Spatial Data Cartridge for Event Processing Systems," U.S. Appl. No. 12/949,081, filed Nov. 18, 2010.

De Castro Alves; et al, "Extensibility Platform Using Data Cartridges," U.S. Appl. No. 12/957,194, filed Nov. 30, 2010.

De Castro Alves; et al, "Class Loading Using Java Data Cartridges," U.S. Appl. No. 13/089,556, filed Apr. 19, 2011.

De Castro Alves; et al, "Extensible Language Framework Using Data Cartridges," U.S. Appl. No. 12/957,201, filed Nov. 30, 2010.

Non-Final Office Action for U.S. Appl. No. 12/395,871, mailed on May 27, 2011, 7 pages.

Non-Final Office Action for U.S. Appl. No. 11/874,202, mailed on Dec. 3, 2009, 20 pages.

Final Office Action for U.S. Appl. No. 11/874,202, mailed on Jun. 8, 2010, 200 pages.

Notice of Allowance for U.S. Appl. No. 11/874,202, mailed on Dec. 22, 2010, 29 pages.

Notice of Allowance for U.S. Appl. No. 11/874,202, mailed on Mar. 31, 2011, 12 pages.

Notice of Allowance for U.S. Appl. No. 11/874,850, mailed on Nov. 24, 2009, 17 pages.
Supplemental Notice of Allowance for U.S. Appl. No. 11/874,850, mailed on Dec. 11, 2009, 5 pages.
Supplemental Notice of Allowance for U.S. Appl. No. 11/874,850, mailed on Jan. 27, 2010, 11 pages.
A Non-Final Office Action for U.S. Appl. No. 11/874,896, mailed on Dec. 8, 2009, 19 pages.
Final Office Action for U.S. Appl. No. 11/874,896, mailed on Jul. 23, 2010, 28 pages.
Non-Final Office Action for U.S. Appl. No. 11/874,896, mailed on Nov. 22, 2010, 25 pages.
A Non-Final Office Action for U.S. Appl. No. 11/977,439, mailed on Apr. 13, 2010, 7 pages.
Notice of Allowance for U.S. Appl. No. 11/977,439, mailed on Aug. 18, 2010, 11 pages.
Supplemental Notice of Allowance for U.S. Appl. No. 11/977,439, mailed on Sep. 28, 2010, 6 pages.
Notice of Allowance for U.S. Appl. No. 11/977,439, mailed on Nov. 24, 8 pages.
Notice of Allowance for U.S. Appl. No. 11/977,439, mailed on Mar. 16, 2011, 10 pages.
Non-Final Office Action for U.S. Appl. No. 11/977,437, mailed on Oct. 13, 2009, 9 pages.
Final Office Action for U.S. Appl. No. 11/977,437, mailed on Apr. 8, 2010, 18 pages.
Notice of Allowance for U.S. Appl. No. 11/977,440, mailed on Oct. 7, 2009, 6 pages.
Office Action for U.S. Appl. No. 11/874,197, mailed on Nov. 10, 2009, 14 pages.
Final Office Action for U.S. Appl. No. 11/874,197, mailed on Jun. 29, 2010, 17 pages.
Non-Final Office Action for U.S. Appl. No. 11/874,197, mailed on Dec. 22, 2010, 22 pages.
Non-Final Office Action for U.S. Appl. No. 11/873,407, mailed on Nov. 13, 2009, 7 pages.
Final Office Action for U.S. Appl. No. 11/873,407, mailed on Apr. 26, 2010, 11 pages.
Notice of Allowance for U.S. Appl. No. 11/873,407, mailed on Nov. 10, 2010, 14 pages.
Notice of Allowance for U.S. Appl. No. 11873,407, mailed on Mar. 7, 2011, 8 pages.
Non-Final Office Action for U.S. Appl. No. 11/601,415, mailed on Sep. 17, 2008, 10 pages.
Final Office Action for U.S. Appl. No. 11/601,415, mailed on May 27, 2009, 26 pages.
Advisory Action for U.S. Appl. No. 11/601,415, mailed on Aug. 18, 2009, 3 pages.
Non-Final Office Action for U.S. Appl. No. 11/601,415, mailed on Nov. 30, 32 pages.
Final Office Action for U.S. Appl. No. 11/601,415, mailed on Jun. 30, 2010, 45 pages.
Non-Final Office Action for U.S. Appl. No. 11/927,681, mailed on Mar. 24, 2011, 17 pages.
Non-Final Office Action for U.S. Appl. No. 11/927,683, mailed on Mar. 24, 2011, 13 pages.
Non-Final Office Action for U.S. Appl. No. 10/948,523, mailed on Jan. 22, 2007, 31 pages.
Final Office Action for U.S. Appl. No. 10/948,523, mailed on Jul. 6, 2007, 37 pages.
Non-Final Office Action for U.S. Appl. No. 10/948,523, mailed Dec. 11, 2007, 47 pages.
Notice of Allowance for U.S. Appl. No. 10/948,523, mailed on Jul. 8, 2008, 30 pages.
Supplemental Notice of Allowance for U.S. Appl. No. 10/948,523, mailed on Jul. 17, 2008, 4 pages.
Notice of Allowance for U.S. Appl. No. 10/948,523, mailed on Dec. 1, 2010, 17 pages.
Hao et al. "Achieving high performance web applications by service and database replications at edge servers," proceedings of IPCCC 2009, IEEE 28th International Performance Computing and Communications Conference, pp. 153-160 (Dec. 2009).
International Search Report dated for PCT/US2011/052019 (Nov. 17, 2011).

* cited by examiner

METHOD AND SYSTEM FOR SPILLING FROM A QUEUE TO A PERSISTENT STORE

CROSS-REFERENCES TO RELATED APPLICATIONS

The present appilacation incorporates by reference for all purposes the entire contents of the following related appilications filed concurrently with the present appilication:

(1) U.S. patent application Ser. No. 12/396,464, filed Mar. 2, 2009, entitled "Framework for Dynamically Generating Tuple and Page Classes,"; and (2) U.S. patent application Ser. No. 12/395,871, filed Mar. 2, 2009, entitled "Infrastructure for Spilling Pages to a Persistent Store,".

BACKGROUND OF THE INVENTION

Embodiments of the present invention relate to memory management, and more specifically to techniques for spilling from memory to a persistent store based upon an evict policy.

In applications such as stock quote monitoring, automobile traffic monitoring, and data sensing, data is generated in the form of a stream of events over time. A data stream, also referred to as an event stream, is a real-time, continuous, sequence of events. Examples of sources that generate data streams include sensors and probes (e.g., RFID sensors, temperature sensors, etc.) configured to send a sequence of sensor readings, financial tickers, network monitoring and traffic management applications sending network status, click stream analysis tools, and others. The term "events" are used interchangeably with "tuples". As used herein, tuples of a stream have the same set of attributes but not necessarily the same attribute values for those attributes. Each tuple is also associated with a particular time. A tuple may be considered to be logically similar to a single row or record in a relational database.

Processing the data streams is often referred to as "stream processing." The data streams may be processed to detect complex patterns, event correlations, relationships between events, etc. For example, a sensor placed at a particular section of a highway may output a data stream comprising information detected by the sensor about automobiles that pass the particular section. A data stream output by the sensor may include information such as the type of automobile, the speed of the automobile, the time that the automobile was on the particular section, and other like information. This data stream may then be processed to determine heavy traffic congestion conditions (indicated by slow average speeds of automobiles), and other traffic related conditions or patterns.

In traditional database systems data is stored in a database, for example in tables in a database. The data stored in a database represents a finite data set against which queries and other data manipulation operations may be performed using a data management language such as SQL. SQL and other traditional database management tools and algorithms are designed based upon the assumption that the tools and algorithms are executed against a potentially large, but finite, collection of data. Such traditional tools and algorithms are unable to handle data streams, as described above, due to the possibly continuous and unbounded nature of data received via the data streams monitored system. Further, storing the events data in a table is impractical due to the large amounts of data that is continually received and the fast frequency at which the data may be received. Due to the ever increasing number of applications that transmit data in the form of a data stream, the ability to process such data streams has become important.

BRIEF SUMMARY OF THE INVENTION

Embodiments of the present invention provide memory management techniques for handling processing of data streams, including bursty data streams. In one embodiment, an evict policy is provided for automatically controlling the eviction of data related to incoming data streams from processing memory (e.g., RAM) to persistent storage (e.g., disk). For example, pages, which are comprised of tuples received by a processing system via one or more data streams, have been buffered in a processing memory of the processing system may be spilled from the processing memory to persistent storage based upon memory usage levels, as specified by the evict policy. This automatic spilling of data from processing memory to persistent store enables the processing system to more efficiently handle processing of data streams, including bursty data streams without significantly hampering the performance of the processing system.

Embodiments of the techniques provided herein enable the event processing server to run smoothly even when the rate at which events arrive suddenly spike, if the memory requirement of the tuples and subsequent processing is more than the memory can manage or if the window size is larger than what is supported by the memory.

In one embodiment, techniques for managing memory usage of a processing system by spilling data from a memory to a persistent store based upon an evict policy are provided. A triggering event is detected. In response to the triggering event and based on the evict policy, it is determined whether data from the memory of the processing system is to be spilled to the persistent storage. The determination is made by comparing a level of free memory of the processing system with a threshold specified by the evict policy. The data is evicted from the memory.

A further understanding of the nature and the advantages of the inventions disclosed herein may be realized by reference of the remaining portions of the specification and the attached drawings.

BRIEF DESCRIPTION OF THE DRAWINGS

The invention may best be understood by reference to the following description taken in conjunction with the accompanying drawings in which.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

A data stream or event stream is a real-time, continuous, sequence of events. The stream thus represents sets of data. The elements in the data stream can be viewed as a series of events and accordingly the data stream is also referred to as an event stream. Events may include temperature readings from a sensor such as 10°, 15°, 20°, etc. When a data stream is received by a system that is configured to process the data stream, referred to as an event processing server (EPS), the data stream is stored in a memory, such as random access memory (RAM), of the EPS as a sequence of <tuple, timestamp> pairs. The timestamps associated with tuples define an order in which the tuples are received. Timestamps in the data stream reflect an application's notion of time. The timestamp is part of the schema of the data stream, and two or more tuples can have the same timestamp or different timestamps.

An EPS may receive data streams either using a push or pull paradigm from one or more sources. In the case of a pull paradigm, the EPS pulls the data streams from a source as needed, and as such, the amount of data received by the EPS is automatically controlled by the EPS itself. On the other hand, in the more common push paradigm, the EPS is agnostic to the existence of the source, and cannot control the data streams and the frequency at which data is received by the EPS. Since the events received in a data stream are typically stored in the processing memory (e.g., RAM) of the EPS for processing, uncontrolled receipt of data streams may cause the memory to quickly fill up, especially if the data stream is a bursty stream. As a result, the EPS may face a memory shortage thereby severely hampering the performance of the event processing system and may even cause it to crash.

Embodiments of the present invention provide memory management techniques for handling processing of data streams, including bursty data streams. In one embodiment, an evict policy is provided for automatically controlling the eviction of data related to incoming data streams from processing memory (e.g., RAM) of the EPS to persistent storage (e.g., disk). For example, tuples received by an EPS via one or more data streams and which have been buffered in a processing memory of the EPS may be spilled from the processing memory to persistent storage based upon memory usage levels, as specified by the evict policy. This automatic spilling of data from processing memory to persistent store enables the EPS to more efficiently handle processing of data streams, including bursty data streams without running into any memory availability problems or without significantly hampering the performance of the EPS.

Figure 1:
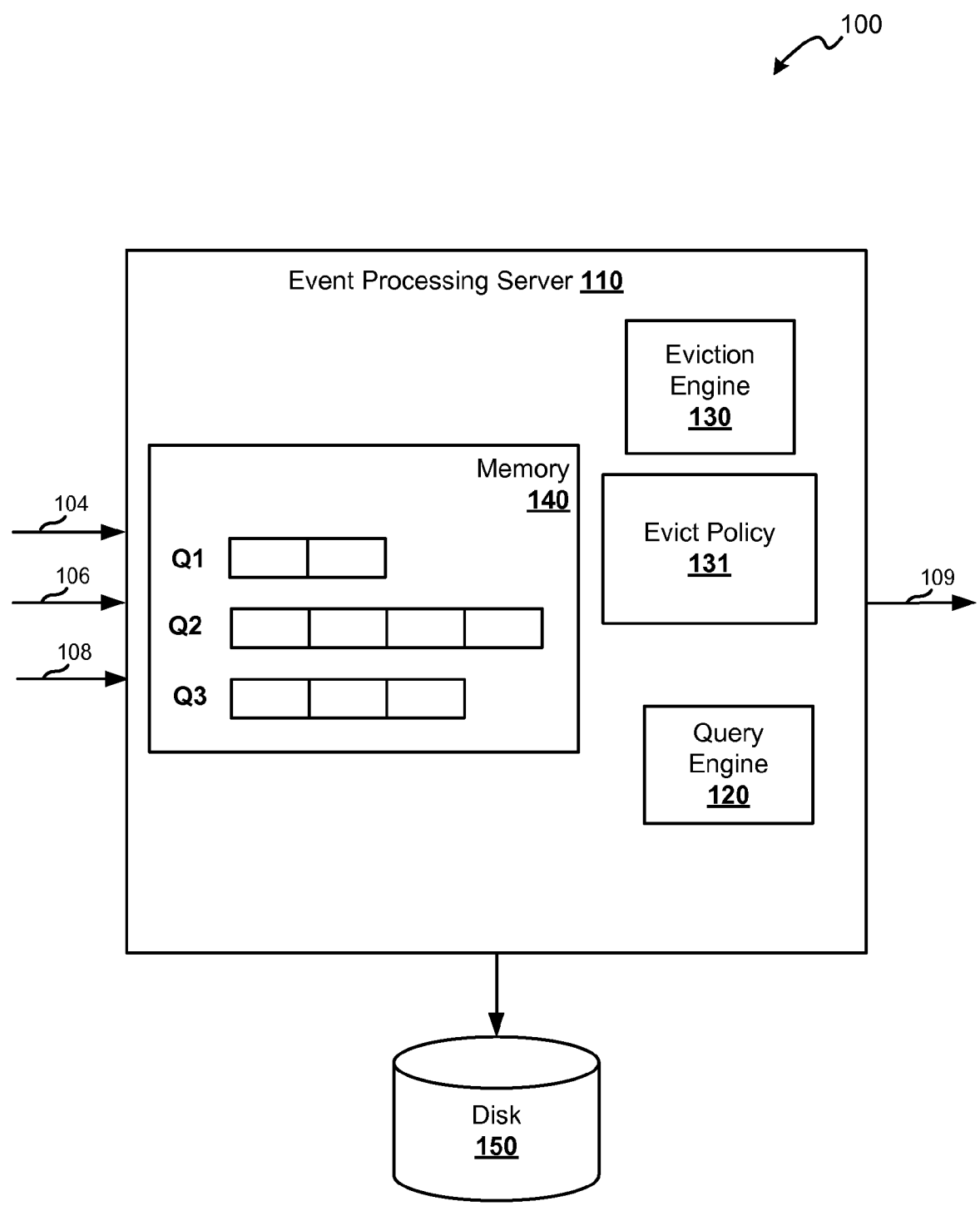
FIG. 1 is a simplified block diagram of a system that incorporates an embodiment of the present invention.

FIG. 1 is a simplified block diagram of a system 100 that incorporates an embodiment of the present invention. As depicted in FIG. 1, system 100 includes an event processing server (EPS) 110 that is configured to receive one or more data streams 104, 106, and 108. Streams 104, 106, and 108 may be received from one or more sources including a database, a file, a messaging service, various applications, devices such as various types of sensors (e.g., RFID sensors, temperature sensors, etc.), tickers, etc. In one embodiment of the present invention, event sources are configured to generate data streams 104, 106, 108. Event sources are event-driven applications. The tuples in the one or more streams 104, 106, and 108 are received by EPS 110 in a sequence at specific time points. EPS 110 may receive streams 104, 106, and 108 via a push-based mechanism or a pull-based mechanism or other mechanisms.

EPS 110 may be configured to perform various types of processing on the incoming streams 104, 106, and 108 such as running continuous queries on the incoming data streams, detecting patterns in the incoming events, etc. EPS 110 may generate an output stream of tuples 109 resulting from the processing. For example, output stream 109 may comprise a sequence of tuples resulting from a continuous query applied to one or more of streams 102, 106, and 108.

In the embodiment depicted in FIG. 1, EPS 110 includes memory 140, an eviction engine 130, and a query engine 120. Memory 140 is shown as being contained within the EPS 110, but may be located elsewhere in other embodiments of the invention. In one embodiment, memory 140 may be random access memory ("RAM") 141.

In a typical scenario, the data received via the data streams is stored in memory 140 awaiting processing of the data. Memory 140, for example RAM, is configured to store <tuple, timestamp> pairs. In addition to the tuples, data structures associated with the tuples may also be stored. These data structures may include, for example, a queue, a store, a synopsis, and overhead for these structures in memory. A queue passes state data of the tuple from one operator to another, for example during execution of a query plan. A store is a data structure which maintains intermediate states of the tuple for performance of operations by operators. In one embodiment of the present invention, the store data structure is optimized to store specific types of state data, for example in a single list or a double list. As such, memory 140 not only stores the incoming data stream, but also the workload during processing of the tuples, such as during execution of a query on the tuples.

In one embodiment, events received by EPS 110 may be stored in one or more queues in memory 140. For example, as depicted in FIG. 1, memory 140 comprises buffer queues Q1, Q2, and Q3. The buffer queues may be implemented as First In First Out (FIFO) queues. The queues may be single reader-writer queues. A buffer queue may be used as a spill-over queue to handle bursty streams, for example, by storing the in-coming tuples. The spill-over queue holds data that may be spilled to disk.

Evict Policy 131 is configured to store information specifying how spilling is to be performed. In one embodiment, evict policy 131 specifies a state diagram comprising one or more states, criteria for transitioning between the states, and actions to be performed in each state. For example, evict policy 131 may identify a Normal state in which no spilling is performed. Accordingly, if EPS 110 is in this state, no spilling is performed. Other states may be specified in which spilling is performed. The nature or type of spilling performed in each state may be different. Actions may include spill or no spill. In one embodiment, the level of free memory available on EPS 110 determines the state of EPS 110. Evict policy 131 is invoked by a triggering event. A free memory level is the measurement of memory that is not in use at the time of measurement. In one embodiment, a weighted average of the consumption of free memory may be used. The level of free memory may be determined by measuring, for example, memory 140 and/or other memory units associated with EPS.

Eviction engine 130 is configured to enforce evict policy 131. Eviction engine 130 is configured to determine the state of EPS 110 at a point in time, monitor a level of free memory of EPS 110 to determine if a state transition is necessary, perform the actions associated with that state. Actions may include spilling data from memory 140 to persistent storage (e.g. disk) 150. As data is evicted, free space is made available in memory 140. In one embodiment of the present invention, the data that is evicted is a page. In one embodiment of the present invention, individual tuples may be stored as a collection in a page structure within memory 140. A page may be an array of tuples or other similar construct.

Enforcement of evict policy 131 may be triggered upon the occurrence of one or more events such as when a tuple is queued in a buffer queue (an enqueue event), when a tuple is removed from a buffer queue (a dequeue event), and other events. In one embodiment, the triggering event is configurable. For example, upon occurrence of an enqueue event, eviction engine 130 is configured to determine a state in which EPS 110 is operating, the state being one of the states specified by evict policy 131. Eviction engine 130 is configured to determine whether EPS 110 remains in the same state or to transition EPS 110 into a new state based on criteria for transition, which is specified by evict policy 131. Eviction engine 130 is also configured to perform actions that are associated with the new state, if a state transition occurred, or the same state, if no state transition was performed. If the new state or the same state is a spill state, spilling is performed from one or more queues. In one embodiment, the spilling is performed in a synchronous mode or asynchronous mode. In the synchronous mode, the action is performed using the thread from a caller (i.e., caller thread). In the asynchronous mode, the action is performed using a separate and independent thread which is asynchronous to the caller thread. In one embodiment the actions may be performed by eviction engine 130 or eviction engine 130 may facilitate the performance of the actions.

Disk 150 provides a persistent memory for storing pages and tuples that are spilled from memory 141 according to evict policy 131. Disk 150 may be internal or external (as shown in FIG. 1 to EPS 110. In general, disk 150 may be in a location accessible to eviction engine 130 for purposes of spilling pages from memory 140.

Evict policy 131 enables more efficient memory management such that EPS 110 is able to handle bursty streams without adversely impacting performance and enables adequate free space in memory 140 to be available for the workload. While the evict policy is being enforced, both of the evicted and non-evicted tuples may be processed by query engine 120 such as by running a continuous query, which is a long-running query, on the incoming data stream, etc. After processing, output data stream 109 is provided by the EPS 110.

By optimizing EPS 110 by performing management techniques, the performance of EPS 110 is greatly enhanced. For example, with more available space in memory 140, EPS 110 is able to handle faster streams, larger window sizes, and workloads which exceed the maximum size of memory 140.

Figure 2:
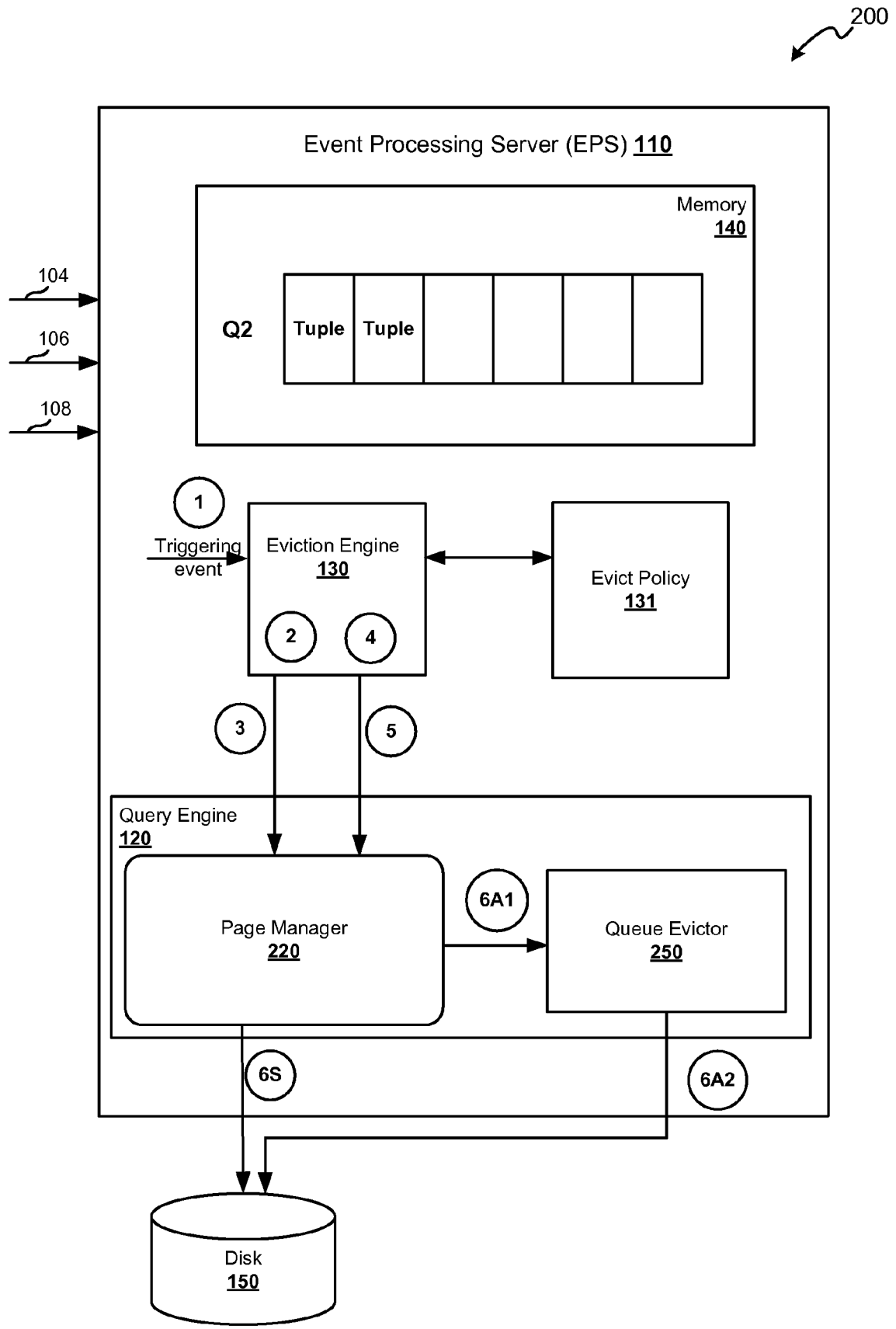
FIG. 2 depicts a simplified block diagram of EPS that is configured to spill streams to a persistent store in accordance with embodiments of the present invention.

FIG. 2 depicts a simplified block diagram of EPS 110 that is configured to spill streams to a persistent store in accordance with embodiments of the present invention. The components of EPS 110 as depicted in FIG. 2 may be implemented in software (e.g., code, instructions, program) executed by a processor, hardware, or combinations thereof.

EPS 110 is configured to receive data streams 104, 106, 108. EPS 110 is comprised of memory 140, query engine 120, and eviction engine 130. Memory 140 is configured to store pages, which are collections of tuples. Memory 140 may store a state of a tuple, such as data structures associated with the tuple, in a buffer queue Q2.

At step 1, a triggering event is determined. Pages which are stored in buffer queue Q2 may be evicted from memory 140 and written to disk 150 based on evict policy 131, as will be described below. In one embodiment of the present invention, a separate queue may be provided for each data stream for buffering tuples received via the data stream. In alternative embodiments, other buffering techniques may be used such as a single queue may be shared by different data streams, or tuples from one stream may be buffered in different queues. The triggering event invokes evict policy 131. Eviction engine 130 is configured to enforce a policy for eviction.

At step 2, a check eviction procedure is invoked by eviction engine 130. Eviction engine 130 uses information specified by evict policy 131 to carry out the check eviction procedure. Evict policy 131 specifies states of EPS, criteria for transitioning between the states, and actions to be performed in each state. To carry out the check eviction procedure, eviction engine 130 determines the state of EPS 110 at a current point in time, determines if a state transition is necessary to a new state, determines an eviction threshold that is associated with the current state or the new state. An eviction threshold is a threshold at which eviction should occur. The eviction threshold is compared to a free memory level. Where the level of free memory satisfies the eviction threshold, a TRUE value is returned, indicating that it is time for an eviction to occur. A FALSE value is returned if the eviction threshold is not satisfied, indicating that eviction is not needed. In one embodiment of the present invention, a more complex threshold methodology can be implemented. Before the triggering event is performed (i.e., enqueue, dequeue, etc.), the result of the check eviction procedure is determined.

Query engine 120 is configured to evict tuples according to evict policy 131 and to run continuous queries on the data sets. Query engine 120 includes page manager 220 and queue evictor 250. At step 3, where the check eviction process indicates that eviction is not required, that indication is made to page manager 220.

Page manager 220 is configured to manage pages, and more particularly, to allocate tuples to pages, keeping track of which tuples are allocated to which page, and spill-out the pages as needed in a synchronous manner. In one embodiment, page manager 220 is implemented as a simple page manager that maintains a list of simple pages. A simple page may be an array of the same type of tuple class. When it is determined that a page should be spilled, that page may be spilled as soon as it is full.

In one embodiment, upon receiving a tuple, an enqueue request is determined. After performing a spilling action, page manager 220 performs the enqueue request on the received tuple. An advance tail process is performed where the pointers associated with the tail of the queue are updated to point to the last tuples of the queue.

A process may be provided for checking the evict policy. Where the check eviction process indicates that eviction is required, at step 4, a run eviction procedure is invoked by eviction engine 130. In one embodiment, a scheduler may invoke the run eviction command. Thus far, evict policy 131 has been used to determine if an eviction is needed. Evict policy 131 may also specify actions that are associated with the current state or the new state. The actions may dictate from which queue to spill from if there are multiple buffer queues in memory 140 and may dictate how to spill, i.e., whether the spilling is to be accomplished via a synchronous mode or an asynchronous mode.

In one embodiment of the present invention, evict policy 131 may also specify candidates for eviction (eviction candidates). An eviction candidate may be a page, which is a collection of tuples. As such, evict policy 131 may dictate which page to evict within a particular queue. Under one approach, the page at the tail end of the queue (from which spilling occurs) is evicted. Other more complicated methods may also be implemented such as the methods described in U.S. patent application Ser. No. 12/395,871, filed Mar. 2, 2009, entitled "Infrastructure for Spilling Pages to a Persistent Store,".

At step 5, eviction engine 130 determines a location of the eviction candidates in memory and provides the location information to page manager 220. The location information may include a page location.

Where evict policy 131 indicates that the mode of spilling is via synchronous eviction, step 6S is performed. At step 6S, page manager 220 uses the page location information to spill the page identified at step 5 from memory 140 and stores the page to disk 150. It should be noted that the page identified at step 5 is not spilled until it is full. Other embodiments are also contemplated. Since the action is performed using the thread from the caller, spilling is synchronized with the caller thread and the event source can be indirectly slowed-down. Once the page has been spilled, the thread returns back to the caller.

On the other hand, where evict policy 131 indicates that the mode of spilling is via asynchronous eviction, steps 6A1 and 6A2 are performed. In the asynchronous mode, queue evictor 250 is configured to perform the spilling, instead of performing the spilling directly by page manager 220. At step 6A1, the page location information is provided from page manager 220 to queue evictor 250. The thread upon which page manager 220 operates returns back to the caller. Queue evictor 250 operates on its own thread and at step 6A2, spills a page out to disk 150 at time that is asynchronous to the caller thread. For example, queue evictor 250 may perform the spilling action at a later point in time.

It should be noted that either one or a combination of the synchronous eviction mode or the asynchronous eviction mode may be implemented. In one embodiment of the present invention, a spilling thread uses a wait and notify scheme, for example. Since queue evictor 250 runs on its own thread (i.e., spilling thread), the asynchronous mode enables the spilling thread to be completed at any time.

In one embodiment of the present invention, evict policy 131 is invoked on dequeue by the stream source. On dequeue, a tuple is read from the front (head) of buffer queue Q2, or from disk 150. Dequeue is a triggering event for invoking evict policy 131. Before dequeue is performed, the check eviction process is invoked in the evict policy 131. The same or similar processing steps that were previously described may also be performed in the context of dequeue. In one embodiment of the present invention, although the check eviction process is invoked at both enqueue and dequeue, the actual eviction is performed on enqueue.

Figure 3A:
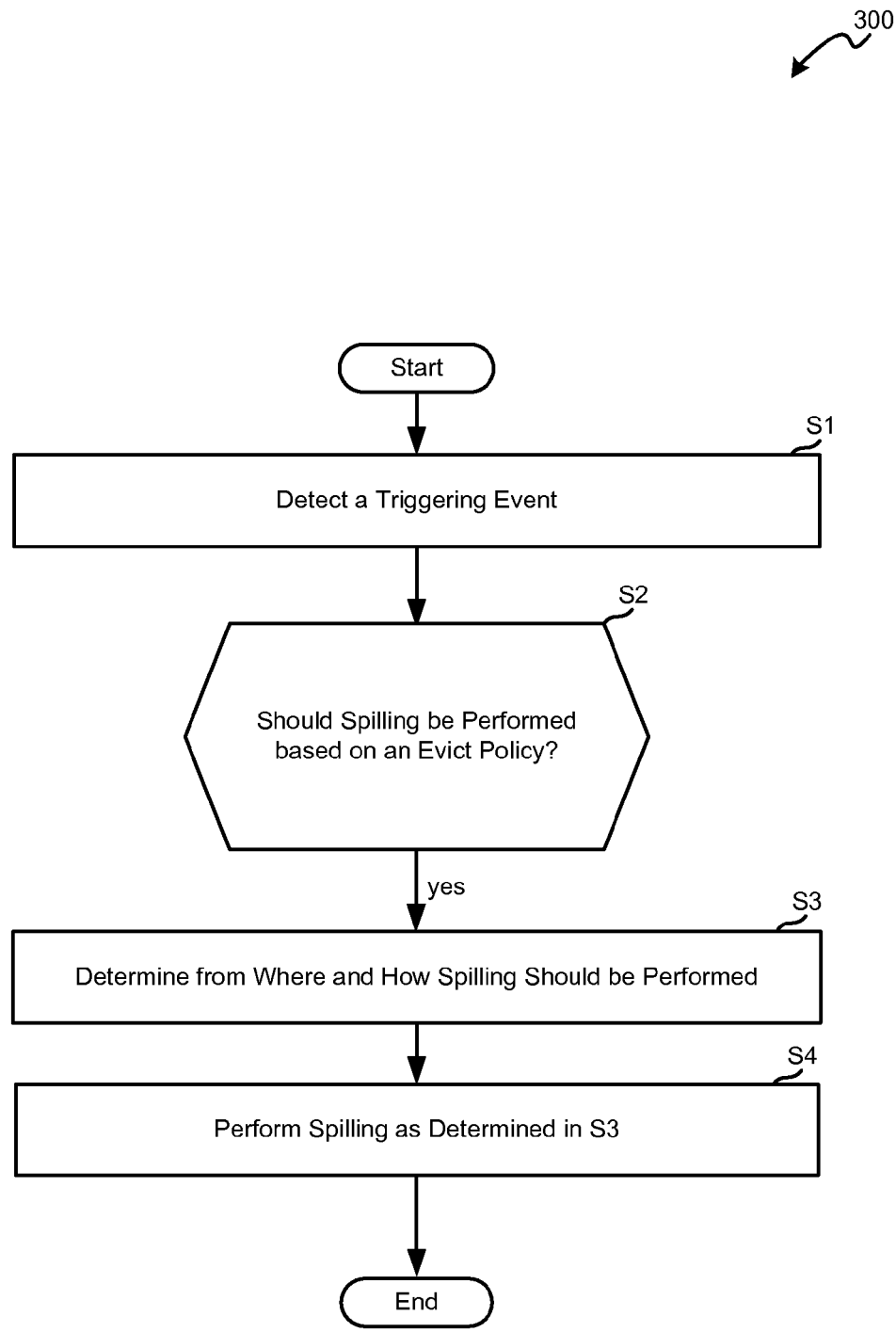
FIG. 3A depicts a simplified method for spilling pages of tuples to disk storage according to an embodiment of the present invention.

FIG. 3A depicts a simplified method 300 for spilling pages of tuples to disk storage according to an embodiment of the present invention. The processing depicted in FIG. 3A may be performed by software (e.g., code, instructions, program) executed by a processor, hardware, or combinations thereof.

At step S1, a triggering event is detected. Triggering events may include an enqueue or dequeue request for an incoming tuple. Tuples can be stored in a buffer queue within memory of EPS. The buffer queue may be a simple FIFO, reader-writer queue. Before the enqueue or dequeue request is fulfilled, the triggering event invokes an evict policy.

At step S2, it is determined whether spilling should be performed based on an evict policy. The evict policy specifies states, how transitions between states are performed, and actions to be performed in each state. Whether or not spilling should be performed is assessed by determining a current state and determining whether a transition is required to a new state based on a comparison of the level of free memory to a threshold for eviction. If either the new state or the current state (if no transition occurred) is a spill state, it is determined that spilling should be performed. A spill state is a state at which one or more pages are spilled from one or more queues. A Normal state is a state at which no spilling occurs. In other words, non-spill states operate under a memory mode.

If spilling should be performed, processing proceeds to step S3, where it is determined from where and how spilling should be performed. In one embodiment of the present invention, the memory of EPS includes a plurality of queues. In such cases, it is determined from which queue the spilling should occur. It may be determined, using the evict policy, that spilling occurs on one or more queues of the plurality of queues. Since the evict policy may look over all queues or a subset thereof, the queues from which spilling will occur are marked. Marking may be performed in any number of ways, for example by using a spilling flag of a queue. Furthermore, how spilling should be performed may be specified as a synchronous mode or an asynchronous mode.

At step S4, spilling is performed. In one embodiment, a page is evicted from the one or more buffer queues determined from step S3.

Figure 3B:
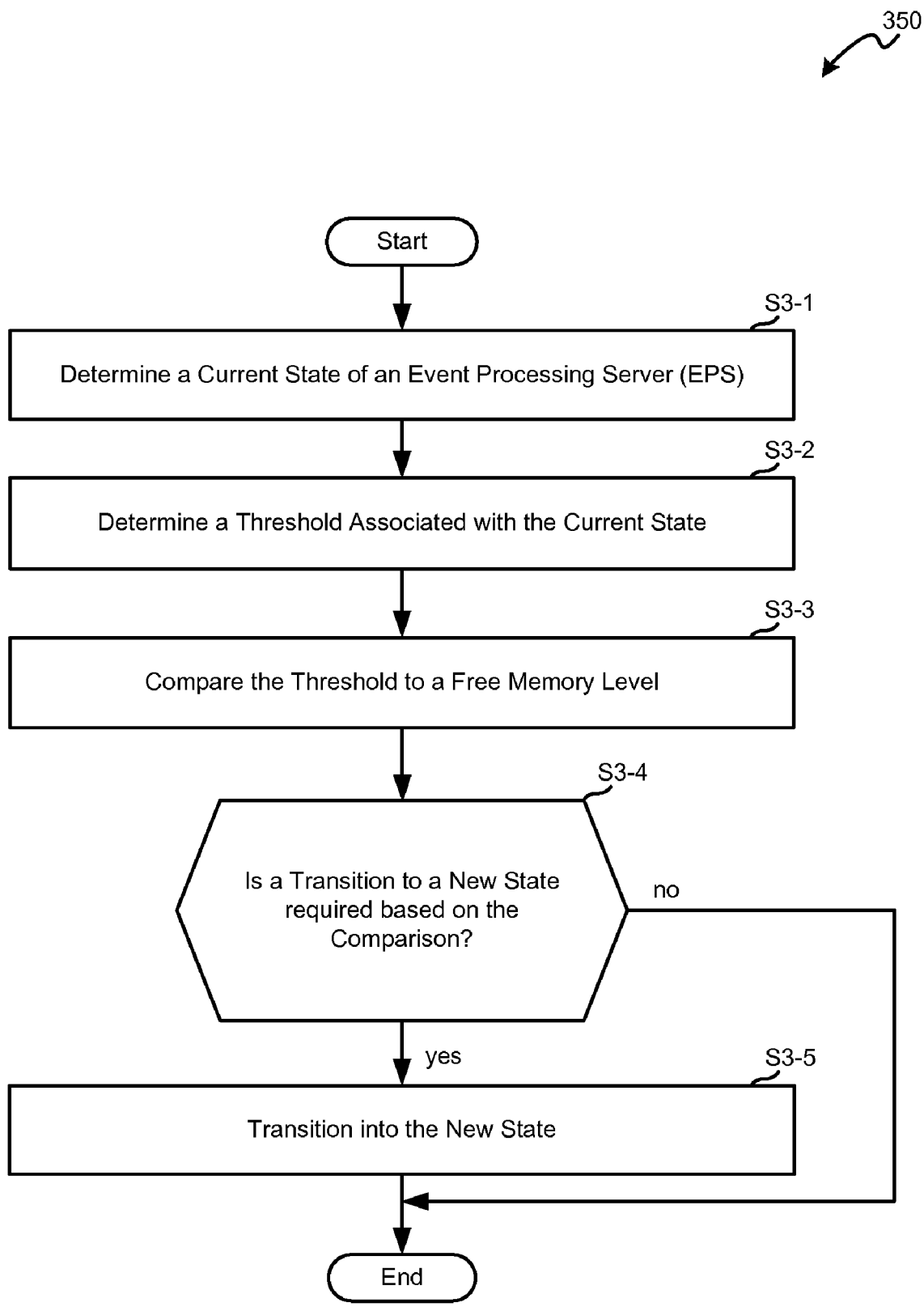
FIG. 3B depicts another simplified method for spilling pages of tuples to disk storage by state determination using an evict policy according to an embodiment of the present invention.

FIG. 3B depicts another simplified method 350 for spilling pages of tuples to disk storage by state determination using an evict policy according to an embodiment of the present invention. The processing depicted in FIG. 3B may be performed by software (e.g., code, instructions, program) executed by a processor, hardware, or combinations thereof.

Once the evict policy has been invoked, at step S3-1, a current state of EPS is determined. An evict policy may be implemented for EPS having multiple states, such as a spill state and a non-spill state. The current state is the state of EPS for a current point in time. In one embodiment, the evict policy runs globally (i.e., one instance) within the system.

At step S3-2, a threshold associated with the current state is determined. Which threshold to use is determined by the state of EPS. States may have unique thresholds associated therewith or may share thresholds with other states. In one embodiment of the present invention, the thresholds are configurable. At step S3-3, the threshold is compared to a free memory level. For example, the threshold may be an eviction threshold, which is a threshold at which eviction occurs.

At step S3-4, it is determined whether a transition to a new state is required based on the comparison at step S3-2. A state transition is a transition from one state to another state. For example, if the free memory level satisfies the eviction threshold a state transition is performed at step S3-5. Otherwise, the transition to the new state is not performed and EPS remains in the current state.

Figure 3C:
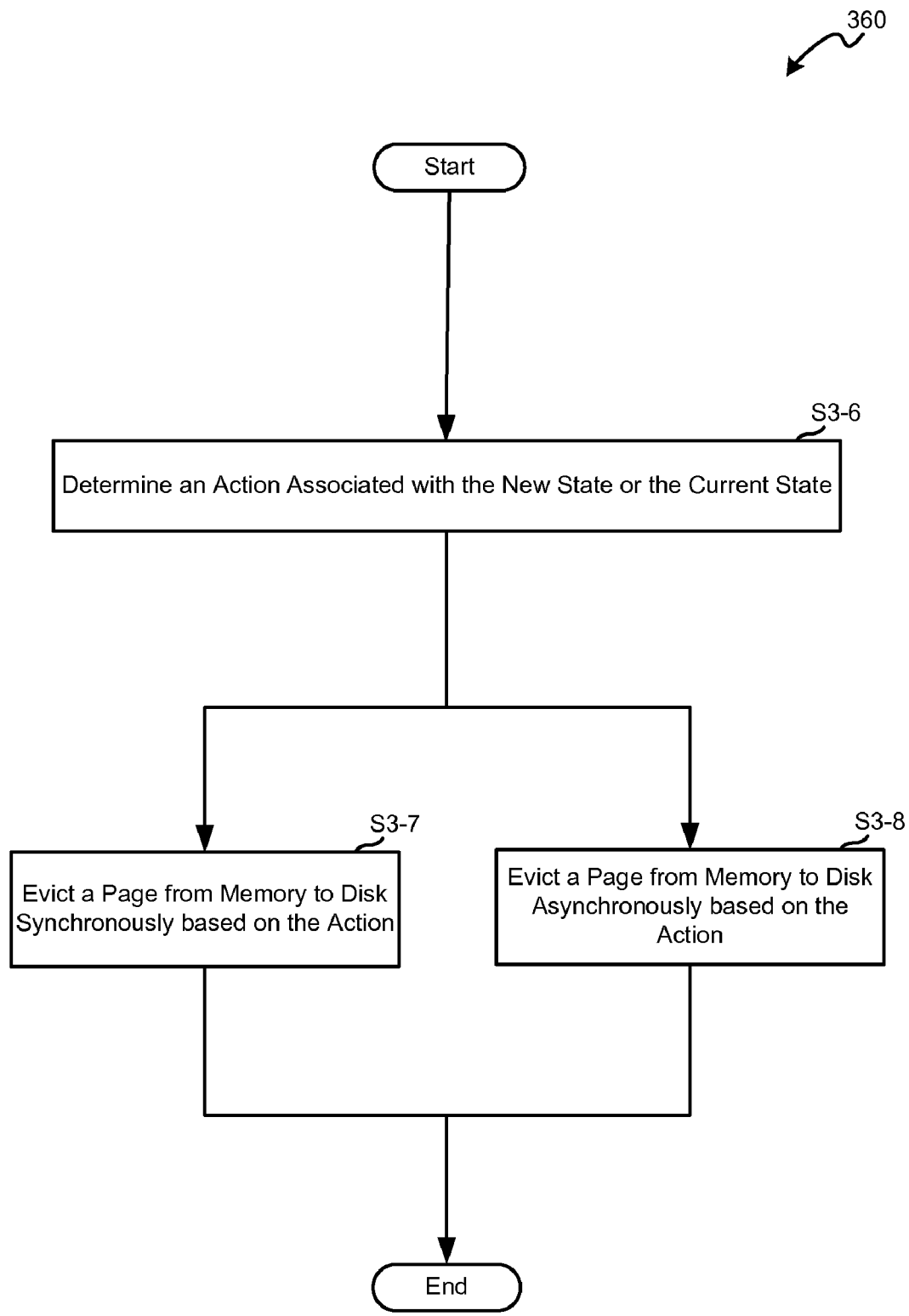
FIG. 3C depicts another simplified method for spilling pages of tuples to disk storage by action determination using an evict policy according to an embodiment of the present invention.

FIG. 3C depicts another simplified method 360 for spilling pages of tuples to disk storage by action determination using an evict policy according to an embodiment of the present invention. FIG. 3C may be continued from step S3-5 of FIG. 3B. In one embodiment, whereas the evict policy runs globally within the system in accordance with the steps described with relation to FIG. 3B, queues may run locally in accordance with one or more of the steps described with relation to FIG. 3C.

At step S3-6, an action that is associated with the new state or the current state is determined. The action includes information specifying from which queue the spilling should occur, where there are multiple queues in the memory. The action also includes information about how the spilling should occur, specifically, spilling according to a synchronous mode or an asynchronous mode. Where the new or current state is in a Normal state, it is determined that spilling need not be performed. Where the new state is in a Normal state such as after a transition from a spilling state (i.e., partial spill, full spill, and synchronous spill) to a Normal state, the new state is reset. Resetting may include clearing any spilling flags of the queue.

At step S3-7, a page is evicted synchronously from memory to disk based on the action. At step S3-8, a page is evicted asynchronously from memory to disk based on the action. In one embodiment of the present invention, the unit for eviction is a page. A page is evicted when full under both asynchronous and synchronous modes. Other eviction units are also contemplated, for example, a partially full page can also be evicted.

Figure 4A:
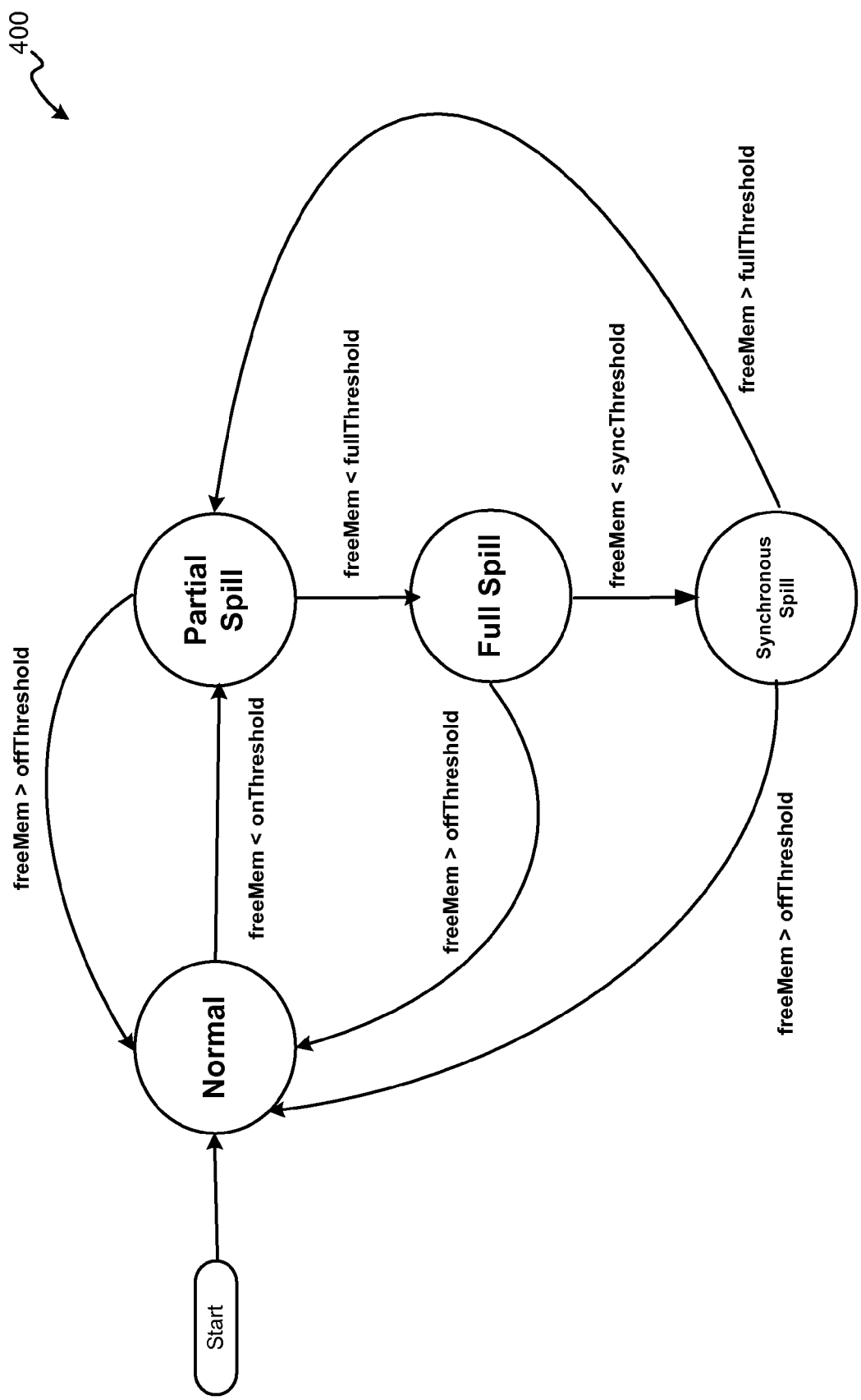
FIG. 4A depicts an example of a state diagram according to an evict policy in accordance with embodiments of the present invention.

FIG. 4A depicts an example of a state diagram according to an evict policy in accordance with embodiments of the present invention. An eviction engine may use an evict policy, such as evict policy 131, to determine whether a transition between states is needed, whether spilling is required based on the state, and what actions are to be performed in each state. Actions may include where to evict from and how to evict. The eviction engine is responsible for monitoring memory usage according to the evict policy. As will be described herein, a more complex threshold methodology can be implemented. On a triggering event, the evict policy is invoked.

Normal State

In a Normal state, all queues are running in a memory mode and no spilling is performed. For example, EPS may include three queues operating in the memory mode, represented as follows:

| Ex) | Q1 (NO_EVICT) |
| | Q2 (NO_EVICT) |
| | Q3 (NO_EVICT) |

While in the Normal state, EPS may remain in a Normal state or may transition into a partial spill state. EPS remains in a Normal state if the free memory level is greater than an onThreshold. The onThreshold is a threshold that indicates when spilling should start. Satisfaction of the onThreshold results in a determination that it is time to start spilling. EPS transitions into the partial spill state if the free memory level is less than or equal to the onThreshold or otherwise satisfied. In one embodiment of the present invention, the onThreshold is 1/3 of the total system memory or 33%. For example, if the free memory level is less than 33% of the total system memory, EPS transitions to the partial spill state. If the free memory is equal to or greater than the onThreshold, no state transition occurs.

Partial Spill State

In the partial spill state, spilling is triggered from the largest queue, where the largest queue has the most number of pages in memory. The other queues run in memory mode. The page at the tail end of the largest queue is spilled when it is full. As previously discussed, checking to determine if an eviction should be done is performed on both enqueue and dequeue. In one embodiment of the present invention, although eviction checking is performed on both enqueue and dequeue, the actual eviction of pages happens on enqueue.

The spilling happens asynchronously by Queue Evictor 250, which operates on its own thread when the page is full. For example, EPS may include one queue operating in the asynchronous eviction mode and two queues operating in memory mode, represented as follows:

| Ex) | Q1 - Largest (ASYNC_EVICT) | (FreeMem > OnThreshold) |
| | Q2 (NO_EVICT) | (FreeMem < FullThreshold) |
| | Q3 (NO_EVICT) | |

While in the partial spill state, EPS may transition into the Normal state, transition into a full spill state, or remain in the partial spill state. EPS transitions into the Normal state if the free memory level satisfies an offThreshold. The offThreshold is a threshold that indicates when spilling should stop. In one embodiment of the present invention, the offThreshold is 1/2 of the total EPS memory or 50%. Satisfaction of the offThreshold results in a determination that it is time to stop spilling. For example, if the free memory level is more than 50% of the total system memory, EPS transitions to the Normal state.

EPS transitions into the full spill state if the free memory level satisfies an fullThreshold. The fullThreshold is a threshold that indicates when spilling should be increased. In one embodiment of the present invention, the fullThreshold is 4/5 of the total system memory or 20%. Satisfaction of the fullThreshold results in a determination that it is time to increase spilling. For example, if the free memory level is less than 20% of the total system memory, EPS transitions to the full spill state. EPS remains in the partial spill state if the free memory level is less than a fullThreshold and more than an offThreshold.

Full Spill State

In the full spill state, all queues start spilling. The spilling happens asynchronously by Queue Evictor 250. On transition from the partial spill state to the full spill state, all pages in memory for the largest queue are spilled first, as the pages become full. Then, all other queues start spilling if it is determined that the amount of free memory is not under control. For example, EPS may include thee queues operating in the asynchronous eviction mode, represented as follows:

| Ex) | Q1 (ASYNC_EVICT) | (FreeMem < FullThreshold) |
| | Q2 - Largest., Evict all pages in memory (ASYNC_EVICT) | |
| | Q3 (ASYNC_EVICT) | |

While in the full spill state, EPS may transition into the Normal state, transition into a synchronous spill state, or remain in the full spill state. EPS transitions into the Normal state if the free memory level satisfies the offThreshold. EPS transitions into the synchronous spill state if the free memory level satisfies a syncThreshold. The syncThreshold is a threshold that indicates when synchronous spilling should be performed. In one embodiment of the present invention, the syncThreshold is 9/10 of the total system memory or 10%. Satisfaction of the syncThreshold results in a determination that it is time to change spilling to the synchronous mode. For example, if the free memory level is less than 10% of the total system memory, EPS transitions to the synchronous spill state. EPS remains in the full spill state if the free memory level is less than the offThreshold and more than the syncThreshold.

Synchronous Spill State

In the synchronous spill state, all queues start spilling synchronously using page manager 220. As such, the client is blocked when the page is evicted. It is possible that queue evictor 250 may hold many pages because it could not catch up with the intake stream. The synchronous spill state can artificially slow-down the client to fill up the queue fast. Note that even in this mode, the page will not be evicted until it is full. In one embodiment, the size of a page may be changed to a smaller size or each tuple may be spilled in this state. For example, EPS may include three queues operating in the synchronous eviction mode, represented as follows:

| Ex) | Q1 (SYNC_EVICT) | (FreeMem < SyncThrehsold) |
|---|---|---|
| | Q2 (SYNC_EVICT) | |
| | Q3 (SYNC_EVICT) | |

While in the synchronous spill state, EPS may transition into the Normal state, transition into a partial spill state, or remain in the synchronous spill state. EPS transitions into the Normal state if the free memory level satisfies the offThreshold and it is determined that spilling is not required. EPS transitions into the partial spill state if the free memory level exceeds the fullThreshold. For example, if the free memory level is greater than 20% of the total system memory, EPS transitions to the partial spill state and it is determined that synchronous spilling is no longer needed. EPS remains in the full spill state if the free memory level is less than the offThreshold and more than the fullThreshold.

In one embodiment of the present invention, the thresholds and/or actions are adjustable, for example by a user. This can allow for greater control of the evict policy.

Figure 4B:
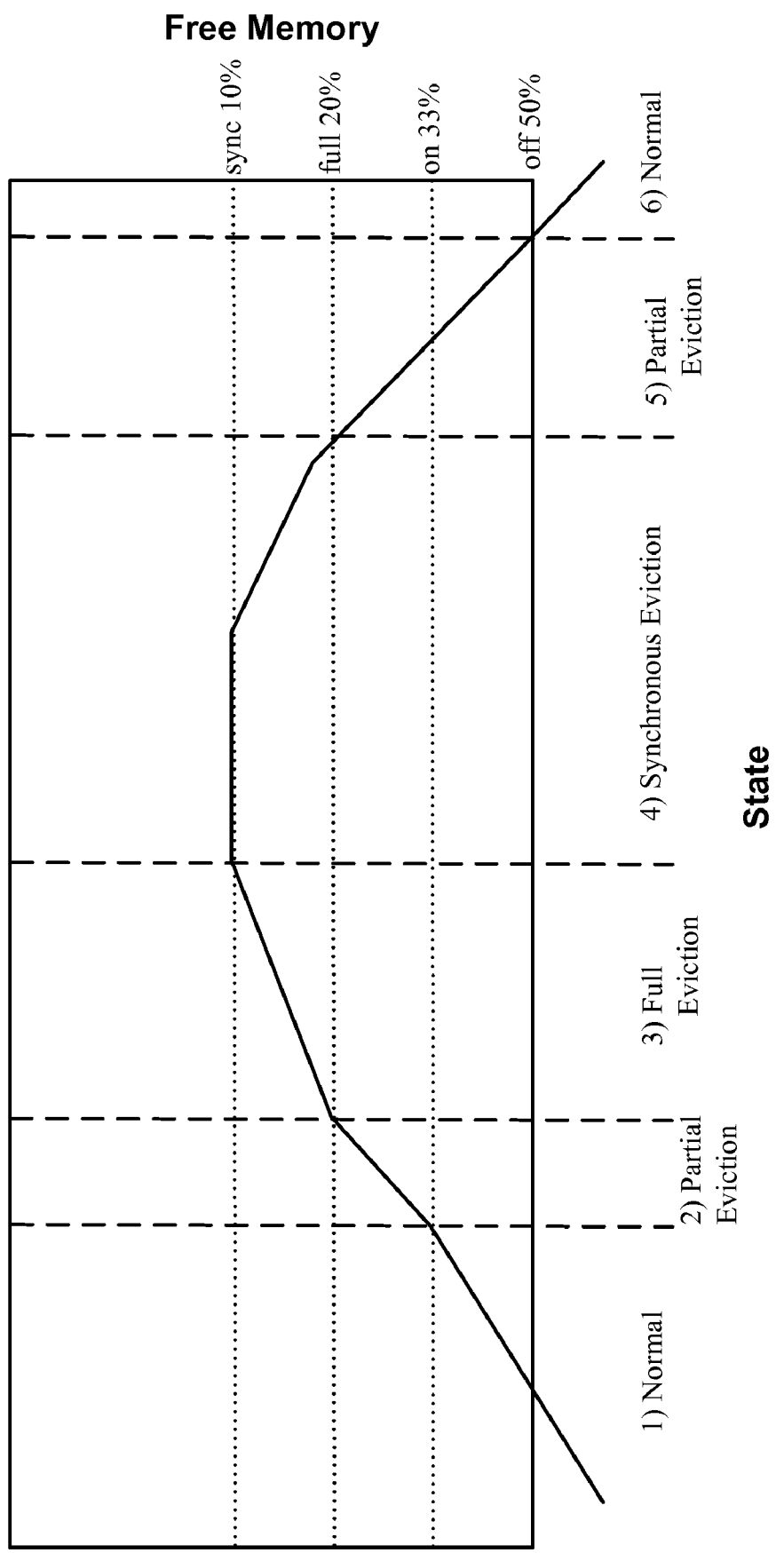
FIG. 4B depicts an example of a diagram correlating a level of free memory and states of an evict policy in accordance with embodiments of the present invention.

FIG. 4B depicts an example of a diagram correlating a level of free memory and states of an evict policy in accordance with embodiments of the present invention.

At stages 1 and 6, where memory usage is low, EPS operates in a Normal state when a level of free memory measures 100%-50%. EPS operates in a partial eviction state when the free memory level measures 20%-33%, at stages 2 and 5 where the memory usage is increasing and decreasing, respectively. EPS operates in a full eviction state when the free memory level measures 10%-20%, at stage 3 where the memory usage is increasing. At stage 4 where memory usage is at its peak, EPS operates in a synchronous eviction state when the free memory level measures less than 10% and continues in the synchronous eviction state as long as the free memory level is more than 20%.

Figure 5:
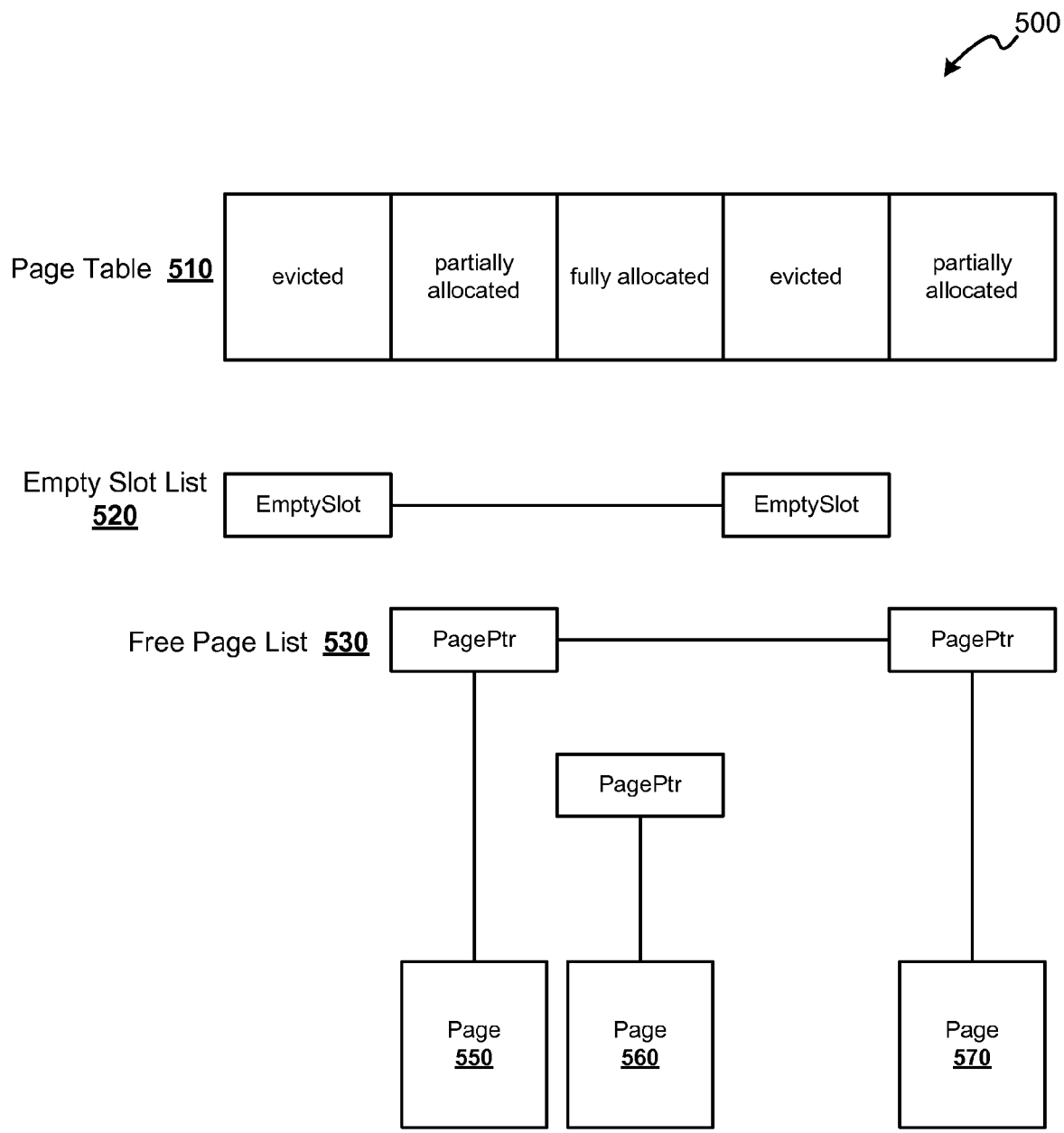
FIG. 5 depicts a simplified block diagram of a page manager system in accordance with embodiments of the present invention.

FIG. 5 depicts a simplified block diagram of a page manager system 500 in accordance with embodiments of the present invention. Page manager system 500 is configured to manage pages in use, and more particularly, to allocate tuples to pages in memory, keeping track of which tuples are allocated to which page, and spill-out the pages as needed.

In one embodiment of the present invention, tuples may be grouped in a page. A page is a structure for storing a collection of tuples. A page may be implemented as an array of tuples or other similar construct. In another embodiment of the present invention, a page may include an individual array for every attribute of an object. For example, as previously described, a tuple may be considered to be logically similar to a single row or record in a relational database and the attributes of the tuple are represented by columns. As such, a page may include an array for every column (i.e., attribute) of the tuple. For example, column 1 might represent an integer, column 2 might represent a float, etc. Each column may be implemented as an individual array, such that array_integer is an array with integer values of multiple tuples and array_float is an array with float values of multiple tuples, for example. The page construct makes manipulation of tuples, including storage and removal of tuples, more efficient. Storage by page, as opposed to storage by individual tuples, decreases overhead by minimizing the disk access.

Page manager system 500 may include page table 510, empty slot list 520, and free page list 530. Page table 510 is configured to keep the pages in use indexed by a page identifier. Page table 510 may be an array of page pointers (PagePtr), or similar construct, which thereby implements the allocation of tuples to pages in memory. The array elements of page table 510 are accessed via a page identifier.

Empty slot list 520 is configured to maintain a list of the empty slots or pages on page table 510. Free page list 530 is configured to maintains a list of pages on page table 510 which have been partially allocated and capable of further allocation. Free page list 530 may be implemented as an array of page pointers. As shown, free page list 530 includes PagePtrs to pages 550, 560, and 570.

In one embodiment of the present invention, an allocation scheme may be implemented by allocating tuples first to a partially allocated page, using the free page list 530. Where a partially allocated page exists, the tuple is allocated to a page at the head of the free page list 530. Partially allocated pages are filled-up until fully allocated. If a page is full and is positioned at the head of the free page list 530, the page is removed from the free page list 530.

Where the free page list 530 indicates that there are no partially allocated pages which are capable of further allocation, a new page may be added. For example, a page from empty slot list 520 may be added to free page list 530 and tuples are allocated to the new page. In another embodiment of the present invention, where the empty slot list 520 is empty and all pages pointed to by page table 510 are completely full, a new page is added, page table 510 is updated to reflect the new page.

The tuple that is to be spilled may be evicted by eviction of the page to which it belongs. As previously described, tuples may be stored in pages in memory when received in a data stream. A free tuple scheme may be implemented such that tuples that have been identified for spilling are evicted from a belonging page in memory. After storing these tuples on disk, these tuples may be evicted or otherwise removed from a belonging page in memory. Where the page is empty, page table 510 is updated with an empty slot and empty slot list 520 is updated. In other embodiments of the present invention, page manager system 500 can support various allocation and free tuple schemes. The default allocation scheme is a "first fit" policy.

In one embodiment of the present invention, a simple page manager may be implemented for a FIFO queue where an entry in the queue is a page. The simple page manager only maintains the head pointer (i.e., page and offset in the page) and the tail pointer. Pages are linked on enqueue and through the advance tail process, the tail pointer is advanced. If the tail page is not full, the offset is increased. Otherwise, a new page is allocated and linked to the current tail page, and the offset points the first element in the page. On dequeue, the head pointer is advanced. If the head pointer reaches the end of the page, the head pointer is set to the next page following the link. In another embodiment, the head pointer is set to the next offset.

Figure 6:
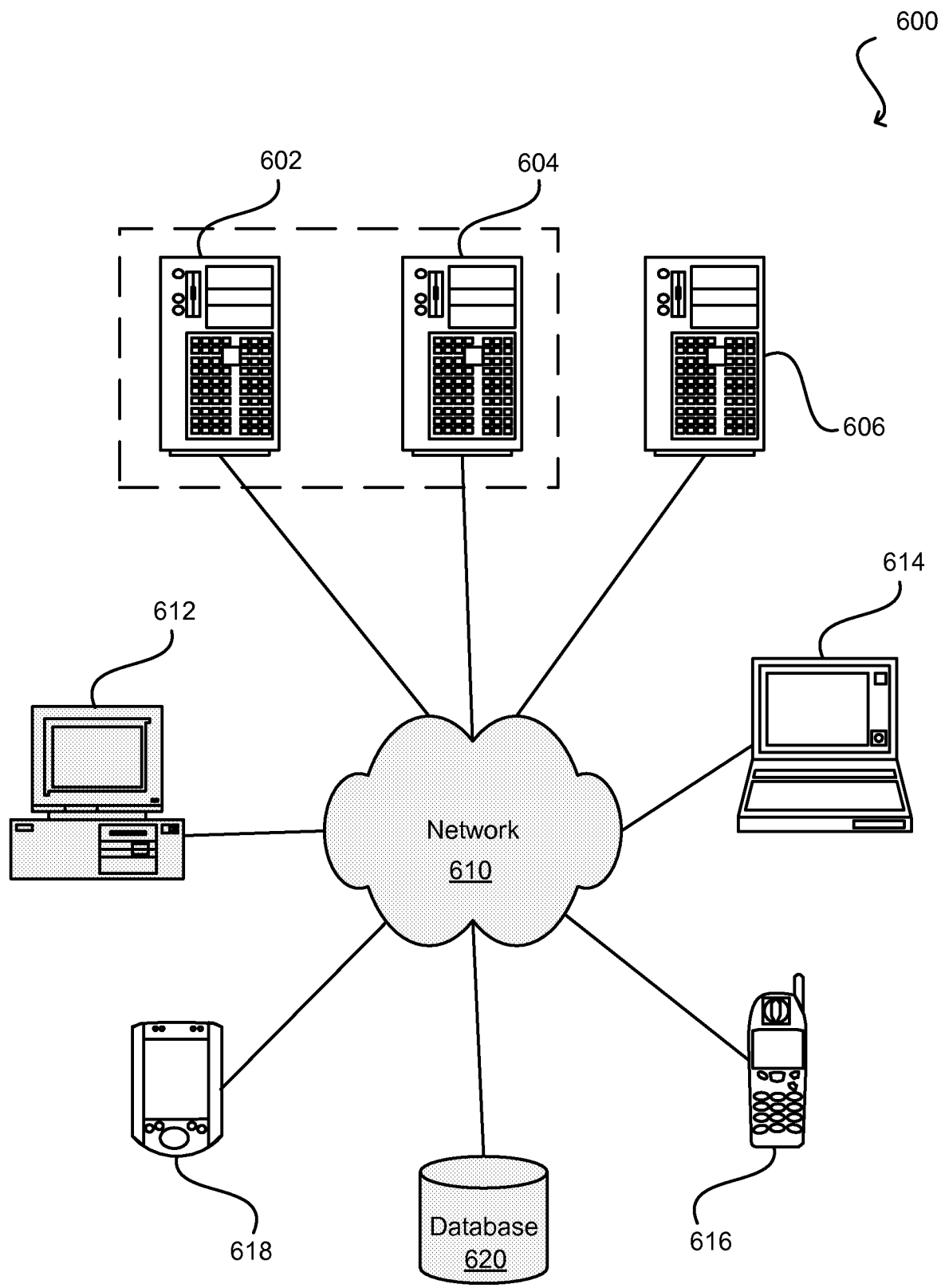
FIG. 6 is a block diagram illustrating components of an operating environment in which various embodiments of the present invention may be implemented.

FIG. 6 is a block diagram illustrating components of an operating environment in which various embodiments of the present invention may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although system 600 is shown with four user computers, any number of user computers may be supported.

In most embodiments, the system 600 includes some type of network 610. The network may can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 10 g, that is adapted to store, update, and retrieve data in response to SQL-formatted commands.

Figure 7:
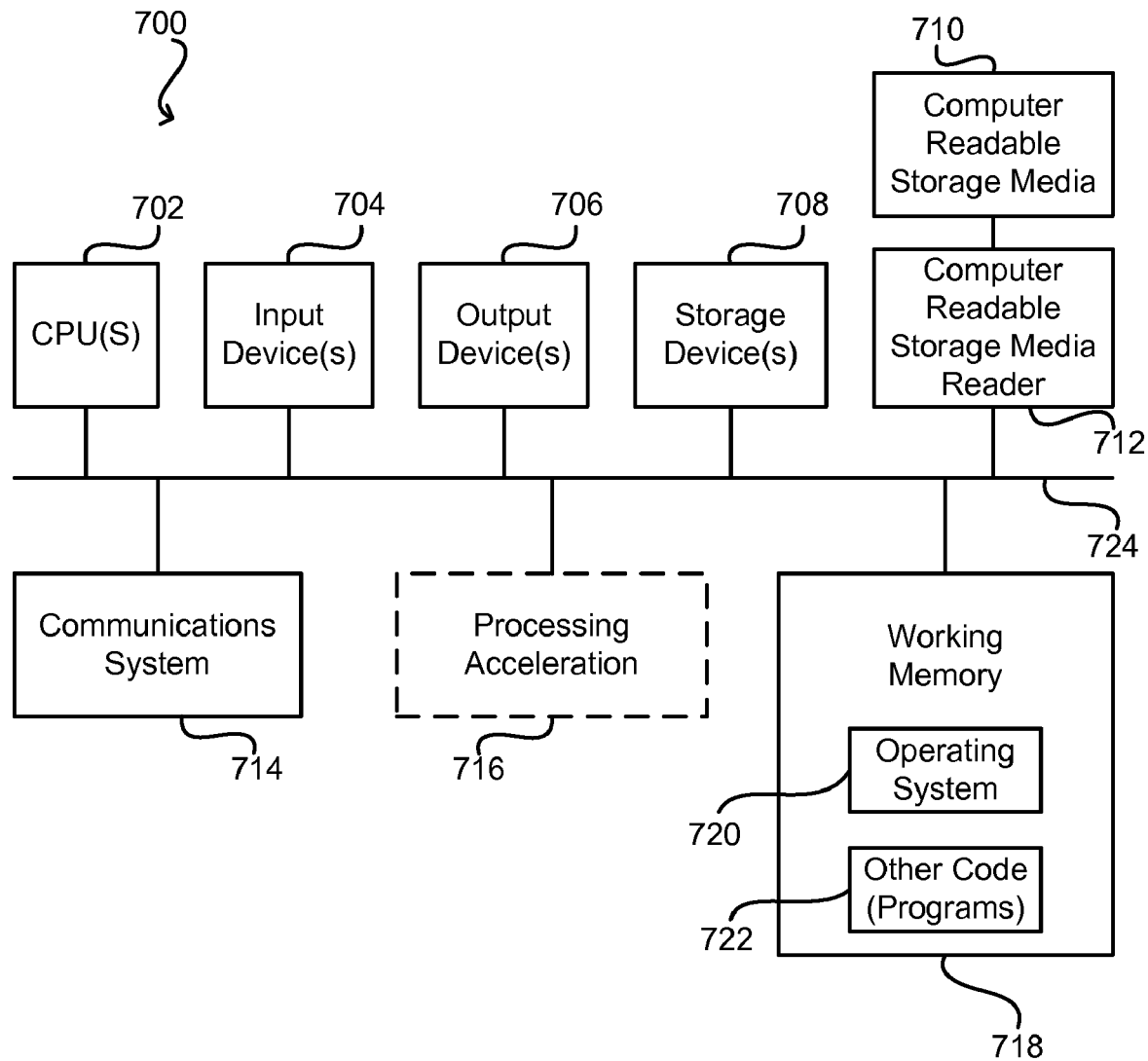
FIG. 7 illustrates a computer system in which various embodiments of the present invention may be implemented.

FIG. 7 illustrates a computer system 700, in which various embodiments of the present invention may be implemented. The system 700 may be used to implement any of the computer systems, such as EPS 110, described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof. It will be recognized by those skilled in the art that while the invention is described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that it can be utilized in any number of environments and applications without departing from the broader spirit and scope thereof. The specification and drawings are, accordingly, to be regarded in an illustrative rather than a restrictive sense.

What is claimed is:

1. A method performed by a data stream processing system for managing memory usage of the data stream processing system, the method comprising:
    detecting a triggering event;
    responsive to the triggering event, determining, based upon an evict policy, whether data from a memory of the data stream processing system is to be spilled to a persistent storage, wherein the memory includes a plurality of buffer queues, and wherein the determining comprises:
        determining a threshold from a plurality of thresholds associated with a current state of the data stream processing system based upon the evict policy; and
        comparing the threshold with a level of free memory of the data stream processing system; and
    evicting the data from the memory.

2. The method of claim 1, further comprising:
    storing the data to the persistent storage.

3. The method of claim 1, wherein the triggering event is receiving an enqueue request or a dequeue request.

4. The method of claim 1, further comprising:
    transitioning the data stream processing system from the current state to a new state based upon the comparison.

5. The method of claim 1, wherein the current state of the data stream processing system is associated with one or more thresholds of the plurality of thresholds.

6. The method of claim 1, further comprising:
    selecting a buffer queue of the plurality of buffer queues from which to perform eviction based upon the evict policy, wherein the data is evicted from the selected buffer queue.

7. The method of claim 1, wherein the evicted data comprises one or more pages of a data stream.

8. The method of claim 7, wherein the eviction of the one or more pages occurs from the largest buffer queue of the plurality of buffer queues.

9. The method of claim 7, wherein the eviction of the one or more pages occurs from each buffer queue of the plurality of buffer queues.

10. The method of claim 7, wherein the eviction of the one or more pages is executed by a thread independent from a caller thread.

11. The method of claim 1, wherein prior to eviction, a buffer queue of the plurality of buffer queues operates according to a memory mode where spilling is not performed.

12. A computer-readable storage medium storing a computer program product for managing memory usage of a data stream processing system, the computer program product comprising:
    computer code for detecting a triggering event;
    computer code for responsive to the triggering event, determining, based upon an evict policy, whether data from a memory of the data stream processing system is to be spilled to a persistent storage, wherein the memory includes a plurality of buffer queues, and wherein the determining comprises:
        determining a threshold from a plurality of thresholds associated with a current state of the data stream processing system based upon the evict policy; and
        comparing the threshold with a level of free memory of the data stream processing system; and
    computer code for evicting the data from the memory.

13. The computer program product according to claim 12, wherein the triggering event is receiving an enqueue request or a dequeue request.

14. The computer program product according to claim 12, wherein the current state of the processing system is associated with one or more thresholds of the plurality of thresholds.

15. The computer program product according to claim 12, the computer program product further comprising:
    computer code for selecting a buffer queue of the plurality of buffer queues from which to perform eviction based upon the evict policy, wherein the data is evicted from the selected buffer queue.

16. A system comprising:
    a processor configured to:
        detect a triggering event;
        responsive to the triggering event, determine, based upon an evict policy, whether data from a memory of a data stream processing system is to be spilled to a persistent storage, wherein the memory includes a plurality of buffer queues, and wherein the determining comprises:
            determining a threshold from a plurality of thresholds associated with a current state of the data stream processing system based upon the evict policy; and
            comparing the threshold with a level of free memory of the data stream processing system; and
        evict the data from the memory.

17. The system according to claim 16, wherein the triggering event is receiving an enqueue request or a dequeue request.

18. The system according to claim 16, wherein the current state of the processing system is associated with one or more thresholds of the plurality of thresholds.

19. The system according to claim 16, wherein the processor is further configured to:

select a buffer queue of the plurality of buffer queues from which to perform eviction based upon the evict policy, wherein the data is evicted from the selected buffer queue.

* * * * *

UNITED STATES PATENT AND TRADEMARK OFFICE
CERTIFICATE OF CORRECTION

PATENT NO. : 8,145,859 B2
APPLICATION NO. : 12/396008
DATED : March 27, 2012
INVENTOR(S) : Park et al.

It is certified that error appears in the above-identified patent and that said Letters Patent is hereby corrected as shown below:

On page 3, in column 2, under "Other Publications", line 36, delete "htmI," and insert -- html, --, therefor.

On page 4, in column 1, under "Other Publications", line 2, delete "1Oth" and insert -- 10th --, therefor.

On page 4, in column 1, under "Other Publications, line 28, delete "SIDART" and insert -- SIGART --, therefor.

On page 4, in column 1, under "Other Publications", line 28, delete "sympposium" and insert -- symposium --, therefor.

On page 4, in column 1, under "Other Publications", line 66, delete "PostgresSQL:" and insert -- PostgreSQL: --, therefor.

On page 4, in column 1, under "Other Publications", line 66, delete "PostgresSQL" and insert -- PostgreSQL --, therefor.

On page 4, in column 1, under "Other Publications", line 68, delete "PostgresSQL:" and insert -- PostgreSQL: --, therefor.

On page 4, in column 1, under "Other Publications", line 68, delete "PostgresSQL" and insert -- PostgreSQL --, therefor.

On page 4, in column 2, under "Other Publications", line 17, delete "strem" and insert -- stream --, therefor.

On page 5, in column 1, under "Other Publications", line 7, before "Non-Final" delete "A".

Signed and Sealed this
Seventeenth Day of July, 2012

David J. Kappos
*Director of the United States Patent and Trademark Office*

CERTIFICATE OF CORRECTION (continued)
U.S. Pat. No. 8,145,859 B2

On page 5, in column 1, under "Other Publications", line 13, before "Non-Final" delete "A".

On page 5, in column 1, under "Other Publications", line 20, delete "24," and insert -- 24, 2010, --, therefor.

On page 5, in column 2, under "Other Publications", line 12, delete "30," and insert -- 30, 2009, --, therefor.

In column 1, line 7, delete "appilacation" and insert -- application --, therefor.

In column 1, line 8-9, delete "appilications" and insert -- applications --, therefor.

In column 1, line 9, delete "appilication:" and insert -- application: --, therefor.

In column 11, line 20, delete "SyncThrehsold)" and insert -- SyncThreshold) --, therefor.